(12) United States Patent
Vyunova et al.

(10) Patent No.: US 11,506,744 B2
(45) Date of Patent: Nov. 22, 2022

(54) ALIGNING INDOOR MAPS WITH QR-CODES

(71) Applicant: HERE Global B.V., Eindhoven (NL)

(72) Inventors: Tatiana Vyunova, Tampere (FI); Marko Luomi, Lempäälä (FI)

(73) Assignee: HERE Global B.V., Eindhoven (NL)

( * ) Notice: Subject to any disclaimer, the term of this patent is extended or adjusted under 35 U.S.C. 154(b) by 76 days.

(21) Appl. No.: 16/943,341

(22) Filed: Jul. 30, 2020

(65) Prior Publication Data

US 2021/0033697 A1 Feb. 4, 2021

(30) Foreign Application Priority Data

Jul. 31, 2019 (EP) ..................................... 19189471

(51) Int. Cl.
| | |
|---|---|
| *G01S 5/02* | (2010.01) |
| *H04W 4/33* | (2018.01) |
| *G06K 7/14* | (2006.01) |
| *H04W 4/02* | (2018.01) |

(52) U.S. Cl.
CPC ........ *G01S 5/02527* (2020.05); *G06K 7/1417* (2013.01); *H04W 4/025* (2013.01); *H04W 4/33* (2018.02)

(58) Field of Classification Search
CPC ..... G01S 5/02527; H04W 4/33; H04W 4/025; G06K 7/1417
See application file for complete search history.

(56) References Cited

U.S. PATENT DOCUMENTS

| | | |
|---|---|---|
| 8,818,706 B1 | 8/2014 | Ogale et al. |
| 10,365,111 B1* | 7/2019 | Chen ...................... G01C 21/28 |
| 2007/0008129 A1* | 1/2007 | Soliman ................ G01S 5/0289 340/572.1 |

(Continued)

FOREIGN PATENT DOCUMENTS

| | | |
|---|---|---|
| KR | 2016-0095398 A | 8/2016 |
| WO | WO 2015/061392 A2 | 4/2015 |
| WO | WO 2019/052653 A1 | 3/2019 |

OTHER PUBLICATIONS

Extended European Search Report for Application No. 19189471.6 dated Feb. 10, 2020, 9 pages.

(Continued)

*Primary Examiner* — Ernest G Tacsik
(74) *Attorney, Agent, or Firm* — Alston & Bird LLP

(57) ABSTRACT

A method includes obtaining or causing obtaining a reference position of the at least one apparatus based on at least one reference tag located at a predefined position of a map represented by map data of at least part of a structure. The method also includes obtaining or causing obtaining identification information of at least one first wireless access point based on a radio signal of the at least one first wireless access point. The method further includes associating or causing associating a first position determined based on the reference position with at least one of: a position estimate determined based on the identification information of the at least one first wireless access point and a radiomap represented by radiomap data of at least part of a structure; of the identification information of the at least one first wireless access point. A corresponding apparatus is also disclosed.

16 Claims, 9 Drawing Sheets

(56) References Cited

U.S. PATENT DOCUMENTS

| | | | |
|---|---|---|---|
| 2013/0095848 A1* | 4/2013 | Gold | H04W 4/023 |
| | | | 455/456.1 |
| 2013/0310073 A1* | 11/2013 | Scozzaro | H04L 67/18 |
| | | | 455/456.1 |
| 2014/0094187 A1* | 4/2014 | LaMarca | G01S 5/0252 |
| | | | 455/456.1 |
| 2014/0171100 A1 | 6/2014 | Marti et al. | |
| 2014/0236475 A1 | 8/2014 | Venkatraman et al. | |
| 2015/0198447 A1 | 7/2015 | Chen et al. | |
| 2017/0019762 A1 | 1/2017 | Prechner et al. | |
| 2020/0142388 A1* | 5/2020 | Maggiore | H04W 4/33 |
| 2020/0218863 A1* | 7/2020 | Huo | G06K 7/1417 |
| 2020/0305111 A1* | 9/2020 | Kuang | G01S 5/0252 |

OTHER PUBLICATIONS

Lee et al., *QRLoc: User-Involved Calibration Using Quick Response Codes for Wi-Fi Based Indoor Localization*, 2012 7th International Conference on Computing and Convergence Technology (ICCCT) (Dec. 2012) 1460-1465.

Nikander et al., *Indoor and Outdoor Mobile Navigation by Using a Combination of Floor Plans and Street Maps*, Lecture Notes in Geoinformation and Cartography (Oct. 2012) 233-249.

\* cited by examiner $ID_{6.1} \longrightarrow (x_i^{C_1}, y_i^{C_1})$
$ID_{6.2} \longrightarrow (x_i^{C_2}, y_i^{C_2})$
$ID_{6.3} \longrightarrow (x_i^{C_3}, y_i^{C_3})$
$ID_{6.4} \longrightarrow (x_i^{C_4}, y_i^{C_4})$

ALIGNING INDOOR MAPS WITH QR-CODES

CROSS-REFERENCE TO RELATED APPLICATIONS

This application claims priority to European Application No. 19189471.6, filed Jul. 31, 2019, the entire contents of which are incorporated herein by reference.

FIELD OF THE DISCLOSURE

The invention generally relates to the field of positioning, more specifically to the field of indoor positioning. The invention specifically relates to a method of associating a first position determined based on a reference position with a position estimate and/or with identification information of at least one wireless access point.

BACKGROUND

Indoor positioning technologies may include indoor positioning solutions based on use of pseudolites, i.e. GPS-like short-range beacons, solutions based on ultra-sound positioning, solutions based on Bluetooth (e.g. Bluetooth Low Energy, BTLE), Wireless Local Area Network (WLAN) or cellular signals. Thereby, solutions based on the latter Bluetooth, WLAN and cellular signals may be considered advantageous in that corresponding technology is supported by existing mobile devices and that corresponding infrastructure already exists in many places.

Indoor positioning may be based on use of radiomaps which may correspond to a collection of radio fingerprints where a radio fingerprint may comprise combinations of radio measurements and location data. Radiomaps may be generated in a crowdsourcing process, where usually multiple mobile devices measure their respective radio environment and acquire radio measurement results as information on the radio environment in a given area. Such radio measurement results may include e.g. results of measurements of signal strength (e.g. Received Signal Strength Indication, RSSI) of received radio signals and/or (e.g. at least) identification information (e.g. IDs) of corresponding wireless access points (APs) such as e.g. Bluetooth and/or WLAN APs and/or APs of one or more cellular communication systems. Combinations of such radio measurement results with corresponding position information (e.g. longitude, latitude and/or altitude coordinates of positions where respective measurement results are acquired) may be stored as collection of corresponding fingerprints, i.e. as radiomap, at each mobile device and/or may be provided to a positioning server (also referred to as positioning cloud) to be remotely stored at said server. For positioning using an existing radiomap, a mobile device may then measure the radio environment, e.g. may acquire at least identification information of one or more corresponding APs, optionally in combination with RSSI values of received radio signals, and may relate (e.g. compare) the measurement result(s) to the existing radiomap to determine an estimate of its position based on said radiomap if stored at the mobile device. Likewise, the mobile device may provide the radio measurement(s) to said positioning server storing a radiomap for the positioning server to relate the measurement(s) to the stored radiomap. The mobile device may then receive a corresponding position estimate from the positioning server. Position estimates of mobile devices in particular obtained indoors may reach an accuracy of 5 to 10 meters.

In cases where structures, e.g. buildings, include more than one floor, acquired fingerprints of a radiomap may further comprise information on absolute altitude. Absolute altitude may correspond to an altitude with respect to a reference altitude such as the mean sea level or a reference altitude based on the WGS (World Geodetic System) 84 reference ellipsoid. When acquiring radio fingerprints, a mobile device may estimate its altitude e.g. using global navigation satellite systems (GNSS) and/or a barometer of the mobile device. Thus, when acquiring radio fingerprints for generating a radiomap, fingerprints may be acquired in combination with absolute altitude information and the radiomap can be generated comprising layers of fingerprints (altitude layers), where each layer includes fingerprints (combinations of horizontal/vertical position information of a position where a radio measurement was obtained with a corresponding measurement result) corresponding to a certain absolute altitude and/or absolute altitude range.

SUMMARY OF SOME EMBODIMENTS OF THE INVENTION

However, while an absolute altitude of an altitude layer of a radiomap may be obtainable with high accuracy, it may still remain desirable to accurately relate such altitude layer to a corresponding floor of a building. In other words, it may still remain desirable to associate altitude layers of a radiomap with relative altitude information indicative of a relative altitude e.g. of floors of an indoor map representing a structure such as a building. Relative altitude may correspond to an altitude difference with respect to a reference altitude. For example, a floor index (0, 1, 2, . . . ) is an example of relative altitude information, e.g. given in relation to floor 0. If such association is missing, it may be challenging to correctly display a position estimate of a mobile device acquired based on a radiomap on an indoor map of a building. In other words, when a user moves with his or her mobile device within a building while observing the position estimate on a display of the mobile device, a displayed indoor map onto which the position estimate is superimposed may undesirably switch between a correct floor and one or more incorrect floors while the user moves trying to position himself or herself within a building using his or her mobile device.

Further, while thus more reliable floor detection may be desirable to ensure that a radiomap, based on which a mobile device position is estimated, is correctly associated with a floor of an indoor map, it may additionally or alternatively be desirable to further enhance accuracy in horizontal alignment of a position estimate in relation to an indoor map of a respective floor of a building. In other words, it may be desirable to align a corresponding radio map with a respective indoor map with enhanced accuracy, e.g. with sub 5 meter accuracy, or even with sub 1 meter accuracy.

It is inter-alia an object of the present invention to provide a positioning solution (in particular an indoor positioning solution) that allows for improved floor detection and/or for enhanced accuracy in horizontal positioning.

According to a first exemplary aspect of the invention, a method performed by at least one apparatus is disclosed, said method comprising:
- obtaining or causing obtaining a reference position of the at least one apparatus based on at least one reference tag located at a predefined position of a map represented by map data of at least part of a structure;

obtaining or causing obtaining identification information of at least one first wireless access point based on a radio signal of the at least one first wireless access point;

associating or causing associating a first position determined based on the reference position with at least one of:

a position estimate determined based on the identification information of the at least one first wireless access point and a radiomap represented by radiomap data of at least part of a structure;

the identification information of the at least one first wireless access point.

According to a second exemplary aspect of the invention, a method performed by at least one further apparatus is disclosed, said method comprising:

obtaining or causing obtaining a first position determined based on a reference position of at least one apparatus obtained based on at least one reference tag located at a predefined position of a map represented by map data of at least part of a structure;

obtaining or causing obtaining identification information of at least one first wireless access point obtained based on a radio signal of the at least one first wireless access point;

associating or causing associating the first position with a position estimate determined based on the identification information of the at least one first wireless access point and a radiomap represented by radiomap data of at least part of a structure.

For each of the methods according to the first and second aspects of the invention, an apparatus is furthermore disclosed (and subsequently referred to as apparatus according to the first or second aspect of the invention) that is configured to perform and/or control the respective method or comprises respective means for performing and/or controlling the steps of the respective method. In this case, it is possible either for all the steps of the respective method to be controlled, or for all the steps of the respective method to be performed, or for one or more steps to be controlled and one or more steps to be performed. One or more of the means can also be performed and/or controlled by the same unit. By way of example, one or more of the means may be formed by one or more processors.

For each of the methods according to the first and second aspects of the invention, an apparatus (e.g. the at least one apparatus according to the first aspect or the at least one further apparatus according to the second aspect) is furthermore disclosed (and subsequently referred to as apparatus according to the first or second aspect of the invention) that comprises at least one processor and at least one memory that contains program code, wherein the memory and the program code are configured to use the at least one processor to cause an apparatus (for example the apparatus having the processor and the memory) to perform and/or control at least the respective method. In this case, it is possible either for all the steps of the respective method to be controlled, or for all the steps of the respective method to be performed, or for one or more steps to be controlled and one or more steps to be performed.

The at least one apparatus according to the first aspect of the invention may correspond to at least one mobile device, for example, such as e.g. an Internet-of-Things (IoT) device, a smart home device, a smartphone, a tablet computer, a notebook computer, a smart watch, and a smart band. The at least one further apparatus according to the second aspect of the invention may correspond to at least one network entity such as at least one server (e.g. a positioning server, a server cloud, a positioning server cloud). The at least one further apparatus according to the second aspect of the invention may be integrated in the back end of a positioning service providing company, for example.

For each of the methods according to the first and second aspects of the invention, a system is furthermore disclosed (and subsequently referred to a system according to the first or second aspect of the invention) that comprises at least one apparatus (e.g. the at least one apparatus according to the first aspect or the at least one further apparatus according to the second aspect) that is configured to perform and/or control the respective method or has means for performing and/or controlling the steps of the respective method. In this case, it is possible either for all the steps of the respective method to be controlled, or for all the steps of the respective method to be performed, or for one or more steps to be controlled and one or more steps to be performed.

Further, a system is disclosed that comprises at least one apparatus according to the first aspect of the invention and at least one further apparatus according to the second aspect of the invention.

In other words, a system is disclosed that may comprise: at least one apparatus configured for:

obtaining or causing obtaining a reference position of the at least one apparatus based on at least one reference tag located at a predefined position of a map represented by map data of at least part of a structure;

obtaining or causing obtaining identification information of at least one first wireless access point based on a radio signal of the at least one first wireless access point; and at least one further apparatus configured for:

obtaining or causing obtaining the first position determined based on the reference position of the at least one apparatus obtained based on the at least one reference tag located at the predefined position of the map represented by the map data of the at least part of the structure;

obtaining or causing obtaining the identification information of at least one first wireless access point obtained based on the radio signal of the at least one first wireless access point;

associating or causing associating the first position with a position estimate determined based on the identification information of the at least one first wireless access point and a radiomap represented by radiomap data of at least part of a structure.

For each of the methods according to the first and second aspects of the invention, a computer program is furthermore disclosed (and subsequently referred to as computer program according to the first or second aspect of the invention) that comprises program instructions that cause a processor to perform and/or control the respective method when the computer program runs on the processor. In this specification, a processor is intended to be understood to mean control units, microprocessors, microcontrol units such as microcontrollers, digital signal processors (DSP), application-specific integrated circuits (ASICs) or field programmable gate arrays (FPGAs), inter alia.

In this case, it is possible either for all the steps of the respective method to be controlled, or for all the steps of the respective method to be performed, or for one or more steps to be controlled and one or more steps to be performed. By way of example, the computer program may be distributable via a network such as the internet, a telephone or mobile radio network and/or a local area network, for example. The computer program may at least in part be software and/or firmware of a processor. It may equally be implemented at least in part as hardware. By way of example, the computer program may be stored on a computer-readable storage medium, e.g. a magnetic, electric, electromagnetic, optical and/or other kind of storage medium. By way of example, the storage medium may be part of the processor, for example a (nonvolatile or volatile) program memory of the processor or a part thereof. By way of example, the storage medium is substantive, that is to say tangible, and/or non-transitory.

Exemplary embodiments of all aspects of the present invention may have one or more (or for instance all) of the properties described below.

As mentioned above, in accordance with the invention, the at least one apparatus, e.g. the mobile device, is configured for obtaining or causing obtaining a reference position of the at least one apparatus based on at least one reference tag located at a predefined position of a map represented by map data of at least part of a structure.

In other words, the at least one apparatus may obtain or one or more processors may cause the at least one apparatus to obtain said reference position. The reference position is obtained based on a reference tag such as for example a barcode, in particular a matrix barcode such as a Quick Response (QR) Code located at a predefined position of a map. As will be clear for a skilled person, a barcode is a machine-readable optical label that contains information about the item to which it is attached. In particular, a QR Code may contain data encoded using e.g. one of four standardized encoding modes (numeric, alphanumeric, byte/binary, and kanji). A QR Code may comprise a number of black squares arranged in a square grid on a white background, which can be read by an imaging device such as a camera, for example a camera comprised by the mobile device. Having acquired an image of the QR Code, the QR Code may be processed at the mobile device (e.g. using one or more processors of the mobile device) employing Reed-Solomon error correction until the image can be appropriately interpreted. Data encoded into the QR Code may then be extracted from patterns that are present in both horizontal and vertical components of the QR Code image.

The predefined position of a map may e.g. correspond to a position on a wall of the structure, e.g. near an entrance of the structure. Said map may for example be an indoor map of at least part of a structure such as a building including one or more floors, the map being represented by corresponding map data. Map data for representing the indoor map may take any form enabling for example display of an indoor map on a display of a mobile device. For example, map data may be in a vector graphics data format and/or in a bitmap data format. In addition or alternatively, map data may be in a format suitable to be used by a geographic information system (GIS) designed to capture, store, manipulate, analyze, manage, and present spatial or geographic data. Such map data may for example be in accordance with the Navigation Data Standard (NDS).

The reference position may thus be obtained by acquiring an image of a QR Code, the QR Code holding available e.g. information including information representative of the QR Code position on said indoor map, relative altitude information indicating the floor of the structure on which the QR Code is placed and corresponding absolute altitude information. It is to be noted that information held available at the reference tag (e.g. the QR Code) is in accordance with all embodiments of the present invention to be understood as information stored at, e.g. encoded in, the reference tag and/or as information that can be obtained via the reference tag, e.g. via a network address (e.g. a download link) held available at the reference tag.

As mentioned above, absolute altitude may correspond to an altitude with respect to a reference altitude such as the mean sea level or a reference altitude based on the WGS (World Geodetic System) 84 reference ellipsoid. Relative altitude may correspond to an altitude difference with respect to a reference altitude, a floor index (e.g. 0, 1, 2, . . . ) being an example of such relative altitude information. Typically, an image of a QR Code is acquired by a (e.g. camera of a) mobile device being within a few centimeters to a few tens of centimeters of the QR Code. A mobile device may thus for example obtain the reference position by setting the reference position equal to the position of the QR Code, the accuracy of said reference position thus being determined by the distance between the mobile device and the QR Code when acquiring the image of the QR Code. In other words, the accuracy of the reference position may thus be within a range of a few centimeters. Taking account of such distance between the QR Code and a mobile device when acquiring the image, the reference position may similarly be set to a position corresponding to the position of the QR Code shifted by a predefined value.

Thus, in an exemplary embodiment, obtaining or causing obtaining the reference position of the at least one apparatus comprises:

setting or causing setting the reference position equal to a position of the at least one reference tag or to a position shifted from a position of the at least one reference tag by a predefined value.

As mentioned above, in accordance with the invention, the at least one apparatus, e.g. the mobile device, is configured for obtaining or causing obtaining identification information of at least one first wireless access point based on a radio signal of the at least one first wireless access point.

As explained above, the at least one apparatus such as a mobile device may acquire radio signals of at least one wireless access point when collecting fingerprints for generating a radiomap or for estimating its position in relation to an existing radiomap (stored at the mobile device or at at least one further apparatus such as a positioning server). It is to be noted that the at least one first wireless access point may correspond to one or more access points transmitting (e.g. broadcasting) one or more radio signals received by the at least one apparatus at an initial position of a track of the at least one apparatus when moving within an area e.g. within said structure, e.g. said building. The at least one first wireless access point may alternatively or in addition correspond to one or more access points transmitting one or more radio signals received by the at least one apparatus at an intermediate position of said track of the at least one apparatus when moving within said area.

In an exemplary embodiment of the invention, a wireless access point is a Wireless Local Area Network, WLAN, access point, a Bluetooth access point and/or an access point of a cellular communications network. A cellular communications network may for example be a mobile phone network like a 2G/3G/4G/5G cellular communication network. The 2G/3G/4G/5G cellular radio communication standards are developed by the 3GPP and presently available under www.3gpp.org/.

The at least one apparatus may obtain the identification information of the at least one first wireless access point, e.g.

an ID of the wireless access point, from the acquired radio signal. The identification information may e.g. be encoded into the acquired radio signal. For example, the at least one apparatus may obtain identification information from e.g. two or more wireless access points by acquiring two or more corresponding radio signals. The at least one apparatus (e.g. a mobile device) may relate the acquired identification information (e.g. two or more IDs corresponding to the two or more wireless access points) to a radiomap stored at the at least one apparatus and may estimate its position by identifying an area where radio signals of the two or more access points can be received in combination. Similarly, the at least one apparatus (e.g. a mobile device) may provide the acquired identification information to at least one further apparatus (e.g. to a positioning server) to be related to a radiomap stored at the at least one further apparatus.

In accordance with an exemplary embodiment, the at least one apparatus (e.g. the mobile device) may be configured to communicate with the at least one further apparatus via a network connection such as a wireless network connection or a wired connection. The at least one apparatus may communicate with the at least one further apparatus via said network connection e.g. to transmit said identification information and/or to receive a position estimate obtained based on said identification information and based on a radiomap e.g. stored at the at least one further apparatus (e.g. the positioning server).

Thereby, in accordance with an exemplary embodiment, a wireless connection may correspond to a communication path or link in a wireless communication network, in particular a terrestrial wireless communication network like a Wireless Local Area Network (WLAN) or a cellular network. WLAN is for example specified by the standards of the IEEE 802.11 family (www.ieee.org/). A cellular network may for example be a mobile phone network like a 2G/3G/4G/5G cellular communication network. The 2G/3G/4G/5G cellular radio communication standards are developed by the 3GPP and presently available under www.3gpp.org/. A wireless connection may further include a Device-to-Device (D2D) communication path (e.g. involving vehicles, mobile devices, Road Side Units (RSU) or IOT devices).

Further, in accordance with an exemplary embodiment, a wired connection may correspond to a communication path or link in a wired communication network employing wire-based communication technology and may correspond to a telephone network connection, a cable television connection, an internet connection, a fiber-optic connection or an electromagnetic waveguide connection.

In accordance with an exemplary embodiment, the obtaining or causing obtaining identification information of at least one first wireless access point may further comprise:
  obtaining or causing obtaining radio quality information of the radio signal of the at least one first wireless access point.

Thereby, the radio quality information may correspond to a signal strength of the received radio signal from the at least one first wireless access point and may be represented by a Received Signal Strength Indication, RSSI. The radio quality information may be used by the at least one apparatus and/or by the at least one further apparatus when estimating the position of the at least one apparatus based on said radiomap stored at the at least one apparatus (e.g. the mobile device) and/or the at least one further apparatus (e.g. the positioning server).

As mentioned above, in accordance with the invention, the at least one apparatus, e.g. the mobile device, is configured for associating or causing associating a first position determined based on the reference position with at least one of:
  a position estimate determined based on the identification information of the at least one first wireless access point and a radiomap represented by radiomap data of at least part of a structure;
  the identification information of the at least one first wireless access point.

In other words, the at least one apparatus is configured for associating or causing associating said first position with said position estimate and/or with said identification information.

It is to be noted that said first position may correspond to or be equal to the reference position. Alternatively, said first position may be a position determined based on the reference position, e.g. may be shifted by an offset value e.g. in a horizontal direction with respect to the reference position.

In exemplary embodiments, the associating or causing associating the first position with the position estimate may enable aligning map data of the indoor map of the structure with the radiomap data representing said structure. In accordance with the first aspect of the invention, the associating or causing associating the first position with the position estimate may be performed by the at least one apparatus (e.g. the mobile device). In accordance with the second aspect of the invention, the associating or causing associating the first position with the position estimate may be performed by the at least one further apparatus (e.g. the positioning server).

As a position of the reference tag, e.g. of the QR Code with respect to the indoor map may be known accurately, the indoor map and the radiomap can be aligned with high accuracy horizontally (e.g. one or more floors of the indoor map can be accurately aligned with one or more corresponding layers of the radiomap) while it becomes possible to accurately associate absolute position information of one or more layers of the radiomap with corresponding one or more floors of the indoor map.

For example, in an exemplary embodiment of the invention, associating or causing associating the first position with the position estimate comprises:
  replacing or causing replacing at least horizontal position data comprised by the radiomap data corresponding to the position estimate with horizontal position data corresponding to the first position.

For example, the first position may be representable by horizontal position data, e.g. first horizontal coordinates (e.g. in longitude and latitude directions) and by vertical position data, e.g. first absolute and/or first relative altitude information. Further, the position estimate may be representable by estimated horizontal position data, e.g. representative of estimated horizontal coordinates (e.g. in longitude and latitude directions) and by estimated vertical position data, e.g. representative of estimated absolute and/or estimated relative altitude information. In particular the estimated horizontal position data may correspond to horizontal position information, e.g. horizontal coordinates, included in said radiomap. Thus, said associating may comprise replacing the horizontal position data of the radiomap corresponding to the position estimate by said first horizontal position data corresponding to the first position.

Thus, by associating the first position with the position estimate, it may in exemplary embodiments be possible to improve accuracy or even correct at least part of existing radiomap data (in particular said horizontal position information corresponding to the position estimate) based on the reference position which corresponds to the well-known position of the reference tag with very high accuracy.

In exemplary embodiments, in addition or alternatively to said replacement of the horizontal position data of the position estimate by the horizontal data of the first position, the at least one first apparatus (e.g. the mobile device) and/or the at least one further apparatus (e.g. the at least one positioning server) may be configured for determining an offset between said first position and the position estimate and for aligning the indoor map with the radiomap by applying said offset as a (e.g. horizontal) shift to data representing the indoor map or to data representing the radiomap.

Thus, in an exemplary embodiment of the invention, associating or causing associating the first position with the position estimate comprises:
  determining or causing determining offset information representing at least a horizontal distance between the first position and the position estimate.

As mentioned above, the first position may be representable by horizontal position data, e.g. first horizontal coordinates (e.g. in longitude and latitude directions) and by vertical position data, e.g. first absolute and/or first relative altitude information. Further, the position estimate may similarly be representable by estimated horizontal position data, e.g. representative of estimated horizontal coordinates (e.g. in longitude and latitude directions) and by estimated vertical position data, e.g. representative of estimated absolute and/or estimated relative altitude information. The offset information may thus for example be determined based on a difference between said first horizontal coordinates and said estimated horizontal coordinates and may thus represent an offset between a horizontal position of the mobile device determined based on the radiomap and a horizontal position of the mobile device determined based on the reference tag. In other words, the offset information may thus represent a shift between the radiomap and the indoor map and may thus be used to compensate for such shift by applying (e.g. adding or subtracting) corresponding offset values (e.g. one respective value representative of said shift in longitudinal direction and one respective value representative of said shift in latitudinal direction) to data representing (at least part of) the indoor map or to data representing (at least part of) the radiomap. By applying corresponding offset values either to data representing the indoor map or to data representing the radiomap, either the map data may be adapted to generate adapted map data, or radiomap data may be adapted to generate adapted radiomap data. By adapting either the map data or the radiomap data, a radiomap and a corresponding indoor map of a structure such as a building may be aligned with a high accuracy which may reach an accuracy of only a few to some tens of centimeters. Indoor positioning of mobile devices within such structure based on a so adapted radiomap may thus lead to a position estimate that may be correctly displayed superimposed to the corresponding indoor map. Similarly, by displaying a position estimate obtained based on a radiomap corresponding to the adapted indoor map superimposed on the adapted indoor map, a correct display of the position estimate on the adapted indoor map can be achieved.

Thus, in other words, in said exemplary embodiment the at least one apparatus and/or the at least one further apparatus may be further configured for at least one of:
  adapting or causing adapting at least part of horizontal position data comprised by the map data based on the offset information to generate adapted map data;
  adapting or causing adapting at least part of horizontal position data comprised by the radiomap data based on the offset information to generate adapted radiomap data.

As mentioned above, the at least one apparatus (e.g. the mobile device) may communicate with the at least one apparatus via said network connection. In an exemplary embodiment of the invention, the at least one apparatus may thus be configured for:
  providing or causing providing the offset information to (the) at least one further apparatus via a network connection; and/or
  providing or causing providing the offset information and the map data of at least part of the structure to at least one further apparatus via a network connection.

Providing or causing providing the offset information to the at least one further apparatus (for example the positioning server) may enable the at least one further apparatus to generate said adapted map data or to generate said adapted radiomap data. Providing or causing providing the offset information in combination with the map data to the at least one further apparatus (for example to the positioning server) may enable use of said map data in combination with the offset information for example by further mobile devices for accurate positioning of said further mobile devices when obtaining the map data in combination with the offset information from the at least one further apparatus (for example from the positioning server) via a similar network connection.

In this exemplary embodiment of the invention, the at least one apparatus may alternatively or in addition be configured for:
  providing or causing providing the adapted map data to at least one further apparatus via a network connection and/or
  providing or causing providing the adapted radiomap data to at least one further apparatus via a network connection.

Thus, in this embodiment, the at least one apparatus (e.g. the mobile device) may provide the adapted map data and/or the adapted radiomap data and may provide the same to the at least one further apparatus (e.g. the positioning server) to enable the at least one apparatus for example to estimate indoor positions of further mobile devices or to enable the at least one apparatus to provide the adapted indoor map to further mobile devices.

In an exemplary embodiment of the invention, associating or causing associating the first position with the position estimate comprises:
  associating or causing associating a subset of the radiomap data corresponding to an absolute altitude or to an absolute altitude range with a subset of the map data representative of one of at least two floors of the structure based on the first position.

As mentioned above, the radiomap data may comprise fingerprints comprising on the one hand horizontal position information (coordinates in longitude and latitude directions) and corresponding measurements of the radio environment. On the other hand, the fingerprints may further comprise absolute altitude information. Based on the altitude information, the radiomap data may be structured into layers of fingerprints where fingerprints of a certain layer may correspond to a certain absolute altitude or to a certain absolute altitude range. Similarly, map data representative of an indoor map of a structure such as a building may comprise map data representative of one or more floors of said structure. As further explained above, the reference tag, for example the QR Code, may include on the one hand absolute altitude information corresponding to its position and relative altitude information (for example a floor index) corresponding to a floor of the structure on which the QR Code is positioned. Based on such information (e.g. based on the first position), the at least one apparatus (e.g. the mobile device) may in this embodiment be configured to associate a subset of the radiomap data (an altitude layer of the radiomap data) corresponding to an absolute altitude or to an absolute altitude range with a subset of the map data representative of one of at least two floors of the structure.

As mentioned above, in accordance with the invention, the at least one apparatus (e.g. the mobile device) may be configured to associate the first position with the identification information of the at least one first wireless access point. Thereby, in exemplary embodiments, the associating or causing associating the first position with the identification information of the at least one first wireless access point may be performed at a beginning and/or during a process of generating new or supplementing existing radiomap data. For example, the first position may correspond to an initial position or to an intermediate position of a track along which the at least one apparatus moves while acquiring fingerprints of the radio environment e.g. as part of a crowdsourcing process when a radiomap of an area including said track is newly generated or supplemented with additional or corrected information.

In an exemplary embodiment of the invention, associating or causing associating the first position with the identification information of the at least one first wireless access point comprises at least one of:
    storing or causing storing the first position in association with the identification information of the at least one first wireless access point as at least part radiomap data;
    providing or causing providing the first position in association with the identification information of the at least one first wireless access point to at least one further apparatus.

In other words, the first position may be stored in association with the identification information (e.g. at the at least one apparatus, e.g. at a corresponding memory of the at least one apparatus) and/or the first position may be provided in association with the identification information (e.g. from the at least one apparatus) to the at least one further apparatus (e.g. the positioning server), in particular to be stored at the at least one further apparatus as at least part of (e.g. newly generated or already existing) radiomap data. In this connection it is to be noted that at least part of is to be understood as newly generated or already existing. In other words, the identification information of the at least one first wireless access point may be stored in association with the first position or may be provided to the at least one further apparatus in association with the first position for newly generating radiomap data or for supplementing already existing radiomap data.

In this context of generating radiomap data or supplementing radiomap data, the first position may be an initial position or an intermediate position of a track along which a mobile device moves while acquiring fingerprints of the radio environment (measurements of received radio signals and/or identification information of corresponding wireless access points in combination with position information of positions where the respective radio signals have been received at the mobile device). Accordingly, the at least one first wireless access point may correspond to one or more access points transmitting (e.g. broadcasting) radio signals received at the mobile device at the first position.

In an exemplary embodiment of the invention, the method performed by the at least one apparatus further comprises at least one of:
    obtaining or causing obtaining identification information of at least one further wireless access point based on a respective radio signal of the at least one further wireless access point received at at least one corresponding further position of a track including the first position while moving along said track.

Thus, the at least one further wireless access point may correspond to one or more wireless access points (potentially including one or more of the one or more wireless access points corresponding to said first wireless access point) transmitting (e.g. broadcasting) radio signals received at the mobile device at said further position.

In this exemplary embodiment of the invention, associating or causing associating the first position with the identification information of the at least one first wireless access point further comprises:
    associating or causing associating the at least one further position with the identification information of the at least one further wireless access point.

In other words, similarly as the first position is associated with the identification information of the at least one first wireless access point, also the further position is associated with the identification information of the at least one further wireless access point. When for example generating or supplementing a radiomap stored at the at least one apparatus (for example the mobile device), said further position (position information thereof) may be stored in association with the identification information of the at least one further wireless access point at the at least one apparatus. Alternatively or in addition, said further position (position information thereof) may be provided in association with the identification information of the at least one further wireless access point to the at least one further apparatus (for example the positioning server), in particular to be stored at the at least one further apparatus for generating new radiomap data at the at least one further apparatus or for supplementing already existing radiomap data at the at least one further apparatus.

In other words, in an exemplary embodiment of the invention, the method performed by the at least one apparatus further comprises:
    storing or causing storing the first position in association with the identification information of the at least one first wireless access point and the at least one further position in association with the identification information of the at least one further wireless access point as at least part of radiomap data.

As mentioned, fingerprints of the radio environment obtained at the first position and at the at least one further position may be stored at the mobile device when generating a new radiomap or for supplementing an existing radiomap already stored at the mobile device.

Alternatively or in addition, in this exemplary embodiment of the invention, the method performed by the at least one apparatus further comprises:
    providing or causing providing the first position in association with the identification information of the at least one first wireless access point and the at least one further position in association with the identification information of the at least one further wireless access point to at least one further apparatus.

As mentioned, fingerprints of the radio environment obtained at the first position and at the at least one further position may be provided to the at least one further apparatus (for example the positioning server) to be used at the at least one further apparatus for generating new radiomap data or to supplement already existing radiomap data.

In an exemplary embodiment of the invention, the method performed by the at least one apparatus further comprises at least one of:

deriving or causing deriving relative altitude information representative of a floor of the structure from the reference position;

assigning or causing assigning the relative altitude information to the at least one further position of the track.

While radiomap data generated in crowdsourcing processes using mobile devices may comprise absolute altitude information obtained at the corresponding mobile devices for example based on GNSS signals or using barometers, it may remain desirable to correctly associate layers of radiomap data corresponding to an absolute altitude and/or absolute altitude ranges with corresponding relative altitude information of a structure (e.g. a building), e.g. with floor indices. As further mentioned above, the above described reference tack, e.g. the QR Code may hold available in particular relative altitude information, e.g. a floor index, corresponding or indicative of a floor of said structure on which the QR Code is positioned. Thus, in this exemplary embodiment, the at least one apparatus (e.g. the mobile device) may be configured for deriving or causing deriving relative altitude information (e.g. a floor index) representative of a floor of the structure (e.g. the building) from the reference position. For example, the reference position may in this exemplary embodiment correspond to horizontal position information (e.g. coordinates in longitudinal and latitudinal directions) and to said relative altitude information. In this exemplary embodiment, the at least one apparatus may further be configured for assigning or causing assigning the relative altitude information to the at least one further position of the track. In other words, the at least one apparatus may be configured for assigning the relative altitude information (e.g. the floor index) obtained at the first position (e.g. corresponding to the reference position) with all fingerprints acquired along the track including the first position. This may prevent undesirable switching the displayed floor of the indoor map when the radiomap data generated in this way is later used by for example a further mobile device when displaying a position estimate of said further mobile device superimposed to an indoor map of the structure while moving within said structure.

Thus, in an exemplary embodiment of the invention, the method performed by the at least one apparatus further comprises at least one of:

storing or causing storing the first position and the at least one further position in association with the relative altitude information, in particular as at least part of said radiomap data.

As described, the at least one apparatus may be configured for associating the relative altitude information obtained at the first position with further positions and/or further fingerprints while moving along the track and for storing said relative altitude information (e.g. a floor index) not only in association with the first position (and a corresponding fingerprint) but further in association with the at least one further position (and with one or more corresponding fingerprints).

Alternatively or in addition, the at least one apparatus (e.g. the mobile device) may be configured for providing or causing providing the first position and the at least one further position in association with the relative altitude information to at least one further apparatus.

In other words, the information may be provided to the at least one further apparatus (e.g. the positioning server) such that the relative altitude information obtained at the first position may be stored in association with the at least one further position (and corresponding fingerprint(s)) at the at least one further apparatus.

In an exemplary embodiment of the invention, obtaining or causing obtaining a reference position of the at least one apparatus based on at least one reference tag comprises:

deriving the reference position from reference position information held available by the at least one reference tag.

Thereby, the reference position information comprises at least one or more of:

information representative of a floor index of a floor of the structure on which the at least one reference tag is located;

information representative of an absolute altitude of a position of the at least one reference tag;

information representative of a position of the at least one reference tag in relation to a floor of the structure on which the at least one reference tag is located; and information representative of longitude and latitude of a position of the at least one reference tag.

As mentioned above, a floor index is an example of relative altitude information and may correspond to a number (e.g. 0, 1, 2, . . . ). Absolute altitude information may correspond to a value (for example measured in meters) indicative of the altitude of the reference tag in relation for example to the sea level. Information representative of the position of the at least one reference tag in relation to a floor may correspond to horizontal coordinates (for example in longitudinal and latitudinal directions) of a position of the reference tag for example of an indoor map of the structure. The reference tag may further hold available longitudinal and latitudinal coordinates (geographical coordinates) of its position.

In an exemplary embodiment of the invention, the method performed by the at least one apparatus further comprises at least one of:

obtaining the map data of the at least part of the structure from the reference tag or based on information held available by the reference tag.

For example depending on a size of the map data, the map data may be stored at the reference tag and may be obtained by the at least one apparatus via communication with the reference tag. Alternatively, the reference tag may include or hold available information based on which the at least one apparatus may obtain the map data. For example, the reference tag may store and/or hold available information indicative of an Internet address, e.g. a download link, using which the mobile device may obtain the map data. Such download link may provide desirable flexibility for example to change map content without having to change the reference tag. Thus, in an exemplary embodiment, the reference tag comprises a download link for downloading the map data.

As explained above, the first position may correspond to the reference position, i.e. may be a position close to the reference position. Related thereto, communication between the at least one apparatus and the reference tag for the at least one apparatus for example to obtain position information of the reference tag may be a short range communication. For example, the reference tag may correspond to a machine-readable optical label such as a barcode or a QR Code. In this case, the at least one apparatus (e.g. mobile device) may be configured for obtaining an image of the machine-readable optical label for example using a camera of the at least one apparatus. Typically, an image taken from such a machine-readable optical label is taken from a distance of only a few centimeters to some tens of centimeters, which in this case then corresponds to a difference between the first position and the reference position. In other words, an achievable accuracy of a positioning method making use of a reference tag as described above may be on the order of only a few centimeters. Reference tags usable in accordance with the present invention may thus include reference tags that allow for acquisition of the above discussed information from the reference tag at the at least one apparatus via a short range communication.

Thus, in an exemplary embodiment of the invention, the at least one reference tag corresponds to or comprises at least one or more of:
 a machine readable optical label;
 a Near-Field Communication, NFC, tag;
 a Radio-Frequency Identification, RFID, tag.

As mentioned, in an embodiment of the present invention, a machine-readable optical label may correspond to a barcode, a matrix code, a QR Code. A Near-Field Communication tag may be a tag allowing for near-field communication (NFC) which uses a set of communication protocols that enable two electronic devices (e.g. the at least one apparatus, e.g. a mobile device and the at least one reference tag) to establish communication by bringing them within a short range (in exemplary cases about 4 cm) of each other. Radio-frequency identification (RFID) tags may establish communication with the at least one apparatus using electromagnetic fields.

Thus, as described in detail above, in an exemplary case in accordance with embodiments of the invention, a QR Code may be provided at a wall of a building. The QR Code may include additional information about the actual position of the QR Code such that the QR Code may serve as reference point. The additional information held available at the QR Code can be used to align the indoor map of the structure (e.g. the building) with radio map of the structure (e.g. the building) using horizontal and vertical position information of the QR Code and floor information of QR Code.

In a specific, non-limiting example, a method in accordance with an embodiment of the invention may be described as follows:
 An indoor map of a building is created.
 A QR Code is created and attached to a wall of the building. The QR Code includes the following information (or a link to that information):
 Indoor map of the building;
 Information about which floor of the building the QR Code is located;
 Information where the QR Code is located on that floor;
 Information about the longitude, latitude and altitude of the QR Code.
 WiFi crowdsourcing takes place automatically when users walk around with a mobile device (e.g. a smartphone) that has a Wi-Fi positioning crowdsourcing agent installed.
 Next a 3D radiomap of the building is created based on the crowdsourced Wi-Fi AP information. The radiomap contains clustered radiomap layers (with altitude information) and therefore enables 3D positioning in the building. As mentioned, it may still be desirable to align positioning results based on said radiomap accurately with floors of the indoor map and with the horizontal true position.
 When QR Code located at the wall of the building e.g. at the entrance of the building is read, an application may be launched at the mobile device that
 Downloads the indoor map of the building;
 Performs WLAN (WiFi) scanning (an example of obtaining identification information of at least one wireless access point) and positioning request to the positioning service (e.g. to positioning server, i.e. an example of the at least one further apparatus);
 Since the location of the QR Code (on the indoor map) is known accurately, the indoor map can be accurately aligned with the positioning data both horizontally (floors and radiomap layers) and vertically (indoor map and true physical location);
 Finally, indoor map with the corrected alignment information is pushed to the server for further use by other users.

It thus becomes possible to reliably align indoor maps also in the case where WLAN (WiFi) crowdsourcing is performed automatically.

It is to be understood that the presentation of the invention in this section is merely by way of examples and non-limiting.

Other features of the invention will become apparent from the following detailed description considered in conjunction with the accompanying figures. It is to be understood, however, that the figures are designed solely for purposes of illustration and not as a definition of the limits of the invention, for which reference should be made to the appended claims. It should be further understood that the figures are not drawn to scale and that they are merely intended to conceptually illustrate the structures and procedures described herein.

DETAILED DESCRIPTION OF THE FIGURES

The following description serves to deepen the understanding of the present invention and shall be understood to complement and be read together with the description of example embodiments of the invention as provided in the above SUMMARY section of this specification.

Figure 1:
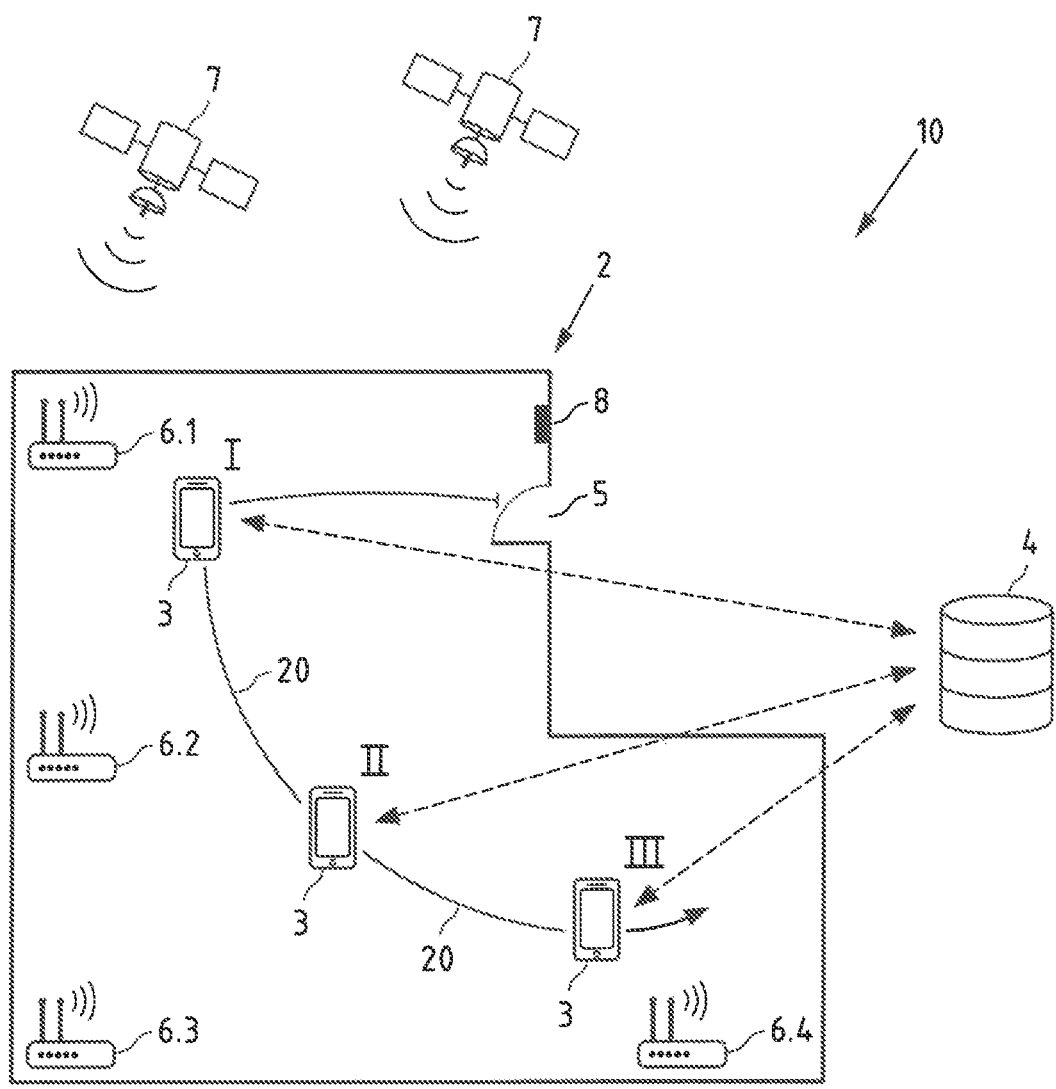
FIG. 1 is a diagram of a system for performing exemplary embodiments of the invention.

FIG. 1 is a diagram of a system 10 for performing exemplary embodiments of the invention. System 10 comprises a server 4 (an example of the at least one further apparatus according to the second aspect of the invention, e.g. of the positioning server) and a mobile device 3 (an example of the at least one apparatus according to the first aspect of the invention). Mobile device 3 is illustrated exemplary moving along track 20 for example during a crowdsourcing procedure of a structure 2. In other words, mobile device 3 may be used for collecting fingerprints of the radio environment (e.g. radio signals transmitted/broadcasted by wireless access points 6.1, 6.2, 6.3, 6.4) in a crowdsourcing process, e.g. in and around structure 2. As explained above, in exemplary embodiments of the invention, a fingerprint corresponds to or is representative of a combination of identification information of one or more wireless access points (e.g. wireless access point IDs), optionally signal quality information (e.g. RSSI) of one or more radio signals received from the one or more wireless access points, and position information of a position where the one or more radio signals are received.

The position information may comprise horizontal position information, e.g. coordinates in longitudinal and latitudinal directions, and vertical position information, e.g. absolute altitude information. When collecting data for generating or supplementing a radiomap, collected position information may be based on signals received from satellites 7 of a global navigation satellite system (GNSS). As such signals may only or primarily be available outside of structure 2, collected position information may alternatively or additionally be based on sensors of the respective mobile device 3, such as a barometer, a motion sensor, an accelerometer, a magnetometer and/or a gyroscope. Fingerprints collected by mobile device 3 when moving along track 20 may be stored at mobile device 3 or may be communicated to server 4.

In an alternative example, track 20 may represent a track along which mobile device 3 moves while a position estimate of mobile device 3 obtained based on radio signals of wireless access points 6.1, 6.2, 6.3, 6.4 is displayed on a display of mobile device 3 superimposed on an indoor map of structure 2.

Mobile device 3 may be enabled to communicate with server 4 via a wireless or a wired network connection (as exemplarily indicated by dashed arrows in the figure). As mentioned above, a wireless connection may correspond to a communication path or link in a wireless communication network, in particular a terrestrial wireless communication network like a Wireless Local Area Network (WLAN) or a cellular network. WLAN is for example specified by the standards of the IEEE 802.11 family (www.ieee.org/). A cellular network may for example be a mobile phone network like a 2G/3G/4G/5G cellular communication network. The 2G/3G/4G/5G cellular radio communication standards are developed by the 3GPP and presently available under www.3gpp.org/. A wireless connection may further include a Device-to-Device (D2D) communication path (e.g. involving vehicles, mobile devices, Road Side Units (RSU) or IOT devices).

Further, in accordance with an exemplary embodiment, a wired connection may correspond to a communication path or link in a wired communication network employing wire-based communication technology and may correspond to a telephone network connection, a cable television connection, an internet connection, a fiber-optic connection or an electromagnetic waveguide connection.

In the example case shown in FIG. 1, mobile device 3 may be enabled to communicate with server 4 using any one of or all of wireless access points 6.1, 6.2, 6.3, 6.4 being connected to server 4 e.g. via a local area network and/or the Internet or via a cellular communication network. While the figure shows only a single floor comprising an entrance 5, structure 2 may comprise more than the shown single floor.

FIG. 1 further shows Quick Response (QR) Code 8 which in the shown exemplary case is placed at a wall of structure 2 near the entrance 5. QR Code 8 is an example of a reference tag in accordance with all aspects of the present invention. As disclosed above, alternative examples of reference tags include for example Near-Field Communication (NFC) tags and Radio-Frequency Identification (RFID) tags.

QR Code 8 may hold available information that may be acquired by mobile device 3 by acquiring an image of the QR Code 8 and by decoding the corresponding optical pattern defined by QR Code 8. Information decoded using said optical pattern may correspond to the actual information, e.g. actual data representative of the information, or may be represented by one or more links (network and/or internet addresses) enabling mobile device 3 to obtain the corresponding information, e.g. by downloading the information via said links.

Among such information, QR Code 8 may for example comprise information representative of an indoor map (map data representative of at least part of structure 2), e.g. of the floor of structure 2 shown in FIG. 1. As said, such information representative of the indoor map held available by QR Code 8 may correspond to a download link or to actual map data.

As disclosed above, QR Code 8 further holds available position information indicating its position in relation to the indoor map. The QR Code 8 may for example include horizontal position information (horizontal coordinates in longitudinal and latitudinal directions) indicating the position where on the floor of the indoor map the QR Code 8 is positioned. Said horizontal position may correspond to relative horizontal position in relation to said indoor map (arbitrary horizontal coordinates defined in longitudinal and latitudinal directions defined in relation to the indoor map) and/or to absolute geographical horizontal coordinates, i.e. geographical longitude and latitude. The position information may further include information representative of a relative altitude of the QR Code 8, e.g. a floor index of the floor of structure 2 on which QR Code 8 is located. The position information may alternatively or in addition include information representative of an absolute geographical altitude of QR Code 8.

Thus, including information of its defined position in relation to the indoor map, QR Code 8 can be used to align the indoor map of structure 2 with a radio map e.g. stored at server 4 and/or at mobile device 3 and/or to support generation of a new radiomap and/or to supplement an existing radiomap.

For example, for aligning an indoor map with an existing radiomap, a mobile device 3 may obtain a position estimate of its position based on said radio map, e.g. mobile device 3 may obtain identification information of wireless access points 6.1, 6.2, 6.3, 6.4, may provide the identification information to server 4 to be related to a radio map stored at server 4 and may obtain the position estimate from server 4. Alternatively, mobile device 3 may be enabled to relate the acquired access point identification information to a radio map stored at mobile device 3 to obtain said position estimate. Mobile device 3 may further obtain the position of QR Code 8 as reference position, e.g. by acquiring and processing an image of the QR Code 8. The obtained reference position of the QR Code 8 may itself serve as the above discussed first position as a position of mobile device 3 when obtaining an image of QR Code 8 is typically within only a few centimeters or a few tens of centimeters of the QR Code 8. Alternatively, said first position may be obtained based on the reference position of QR Code 8 e.g. by applying a shift to said position.

Based on the obtained position estimate and the reference position, the indoor map and the radiomap can be aligned at mobile device 3 and/or at server 4. For example, the reference position may be used to replace position information of the radiomap based on which the position of mobile device 3 has been estimated. Alternatively or in addition, offset information may be determined representing at least a shift or deviation between the reference position of the QR Code 8 and the position of mobile device 3 estimated based on the radiomap. This offset information can then be used to adapt either the indoor map or the radiomap. For example values representing said shift in longitudinal and latitudinal direction may be added or subtracted to coordinate values of positions of the indoor map or of positions of the radiomap. In other words, the offset information can be used to shift either the indoor map with respect to the radiomap or to shift the radiomap with respect to the indoor map to compensate for an offset determined based on the horizontal difference between the reference position of the QR Code 8 and the position of the mobile device estimated based on the radiomap. Such alignment of indoor map and radiomap can be accurate up to a distance between mobile device 3 and QR Code 8 at the point in time when mobile device 3 acquires said image of QR Code 8. The alignment of the indoor map and the radiomap can be performed at mobile device 3 or at server 4. In the latter case, mobile device 3 may provide at least the offset information to server 4 via said network connection.

Figures 2A, 2B:
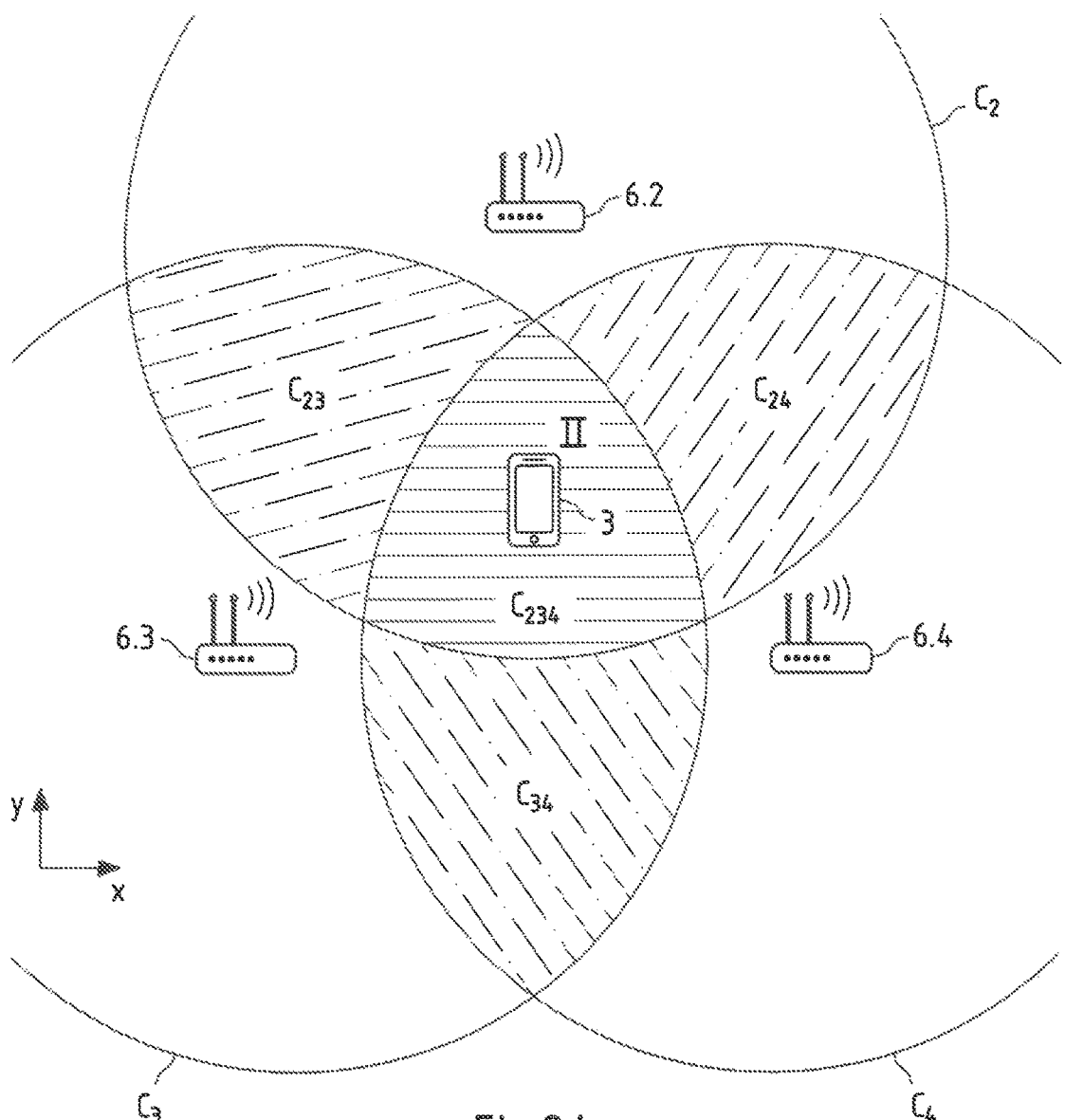
FIG. 2A is a schematic illustration of a radio environment of a mobile device.
FIG. 2B illustrates an exemplary illustration of a radiomap.

FIG. 2A exemplarily illustrates a simplified radio environment of mobile device 3 within structure 2 which may be used to estimate a position of mobile device 3, e.g. to obtain an estimate of the position of mobile device 3 in horizontal coordinates in longitudinal and latitudinal directions (x and y directions shown in FIG. 2A). For conciseness, only simplified radio signal ranges C2, C3, C4 of wireless access points 6.2, 6.3, 6.4 is illustrated, the radio signal ranges simplified as overlapping circles. FIG. 2A illustrates areas, where respective radio signal ranges mutually overlap, i.e. area C23 where radio signal ranges C2 and C3 overlap, area C24 where radio signal ranges C2 and C4 overlap, area C34, where radio signal ranges C3 and C4 overlap and area C234, where radio signal ranges C2, C3 and C4 overlap. As can be taken from FIG. 2A, when mobile device 3 acquires identification information of all wireless access points 6.2, 6.3, 6.4, based on the corresponding identification information, a position of mobile device 3 can be estimated to be within the area of overlap C234. Similarly, if mobile device 3 would require only identification information of wireless access points 6.2 and 6.3, a position of mobile device 3 could be estimated to be within an area of overlap C23.

As disclosed above, measurements of the radio environment of mobile device 3 when for example moving along track 20 as shown in FIG. 1 can be used by mobile device 3 for building a new or for supplementing an existing radiomap. To this end, mobile device 3 may obtain identification information of wireless access points from which mobile device 3 receives radio signals based on the received radio signals and may associate the obtained identification information with position information of the position where mobile device 3 has received the radio signals. Position information of said position may be obtained by the mobile device 3 for example using signals of GNSS satellites 7. In particular when moving indoors, such position information may be obtained based on sensors of the mobile device 3, such as a barometer, a motion sensor, an accelerometer, a magnetometer and/or a gyroscope. FIG. 2B illustrates an exemplary non-limiting representation of a radiomap which may represent an indoor area of structure 2 of FIG. 1. As shown, identification information of wireless access points 6.1, 6.2, 6.3, 6.4, i.e. corresponding IDs (ID6.1, ID6.2, ID6.3, ID6.4) are stored (either at mobile device 3 and/or at server 4) in association with position information of positions where radio signals of the respective wireless access points are receivable. In the shown case, position information corresponds to horizontal coordinates in longitudinal and latitudinal directions. In the shown example, for example coordinates $x_i^{c1}$, $y_i^{c1}$ are x, y coordinates representative of positions i where radio signals from wireless access point 6.1 are receivable. Similarly, $x_i^{cj}$, $y_i^{cj}$ are x, y coordinates representative of positions i where radio signals from wireless access point 6.j are receivable.

As mentioned, the concept illustrated using FIG. 2A and FIG. 2B is simplified and only intended to illustrate the concept. In addition to identification information, radio quality information, for example Received Signal Strength Indication, RSSI, may further be stored with respective fingerprints. In such case, a fingerprint may further comprise "z"-information (representative e.g. of RSSI) and a single wireless access point may have a cone-shaped radiomap where a high signal strength may be associated with a small distance from the access point (large z-value at x, y=0) and where signal strength decreases with distance from the wireless access point. Thus, if upon positioning, a fingerprint is received by mobile device 3, such fingerprint may comprise identification information of three wireless access points and three corresponding RSSI-values. The additional RSSI information may be used to obtain a position estimate with higher accuracy.

Figure 3:
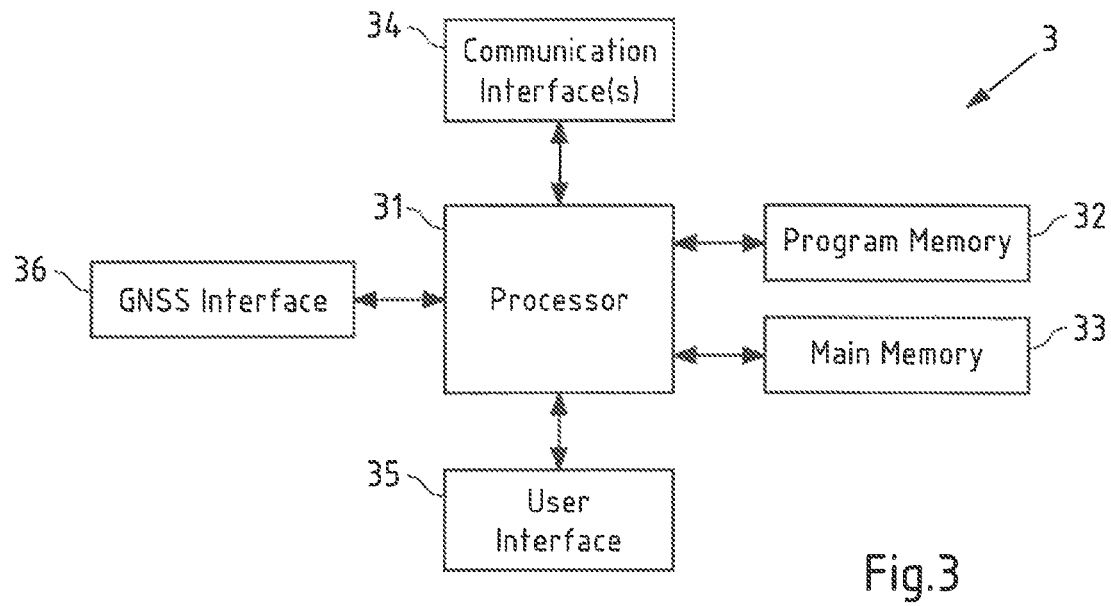
FIG. 3 is a block diagram of a mobile device of FIG. 1 as an example of an apparatus according to the first aspect of the invention.

FIG. 3 is a block diagram of mobile device 3 of FIG. 1 as an example of the at least one apparatus according to the first aspect of the invention.

Mobile device 3 comprises a processor 31. Processor 31 may represent a single processor or two or more processors, which are for instance at least partially coupled, for instance via a bus. Processor 31 may use program memory 32 and main memory 33 to execute a program code stored in program memory 32 (for instance program code causing mobile device 3 to perform embodiments of the different methods, when executed on processor 31). Some or all of memories 32 and 33 may also be included into processor 31. One of or both of memories 32 and 33 may be fixedly connected to processor 31 or at least partially removable from processor 31. Program memory 32 may for instance be a non-volatile memory. It may for instance be a FLASH memory, any of a ROM, PROM, EPROM and EEPROM memory or a hard disc, to name but a few examples. Program memory 32 may also comprise an operating system for processor 31. Main memory 33 may for instance be a volatile memory. It may for instance be a RAM or DRAM memory, to give but a few non-limiting examples. It may for instance be used as a working memory for processor 31 when executing an operating system and/or programs.

Processor 31 further controls one or more communication interfaces 34 configured to receive and/or send information.

For instance, mobile device 3 may be configured to communicate with server 4 of system 10 of FIG. 1. Such a communication may for instance comprise providing (transmitting) collected fingerprints from mobile device 3 to server 4. Also, mobile device 3 may be able to receive e.g. a radio map or a determined position estimate of mobile device 3 from server 4 for the purpose of positioning. The communication may for instance be based on a (e.g. partly) wireless connection. The communication interface 34 may thus comprise circuitry such as modulators, filters, mixers, switches and/or one or more antennas to allow transmission and/or reception of radio signals. In embodiments of the invention, communication interface 34 is inter alia configured to allow communication according to a 2G/3G/4G/5G cellular communication system and/or a non-cellular communication system, such as for instance a WLAN network and/or a Bluetooth network.

Processor 31 further controls a user interface 35 configured to present information to a user of mobile device 3 to receive information from such a user, such as manually input position fixes, a site map or floor plan of the area or the like. User interface 34 may for instance be the standard user interface via which a user of mobile device 3 controls other functionality thereof, such as making phone calls, browsing the Internet, etc.

Processor 31 may further control a GNSS interface 36 configured to receive position information of a GNSS such as Global Positioning System (GPS), Galileo, Global Navigation Satellite System (i.e. "Globalnaja Nawigazionnaja Sputnikowaj a Sistema", GLONASS) or Quasi-Zenith Satellite System (QZSS). In case of mobile device 3, the location information of GNSS interface 36 (potentially in connection with further sensors of mobile device 3, such as an inertial sensor, an accelerometer or gyroscope) may be used in order to obtain position information.

The components 32-36 of mobile device 3 may for instance be connected with processor 31 by means of one or more serial and/or parallel busses.

Figure 4:
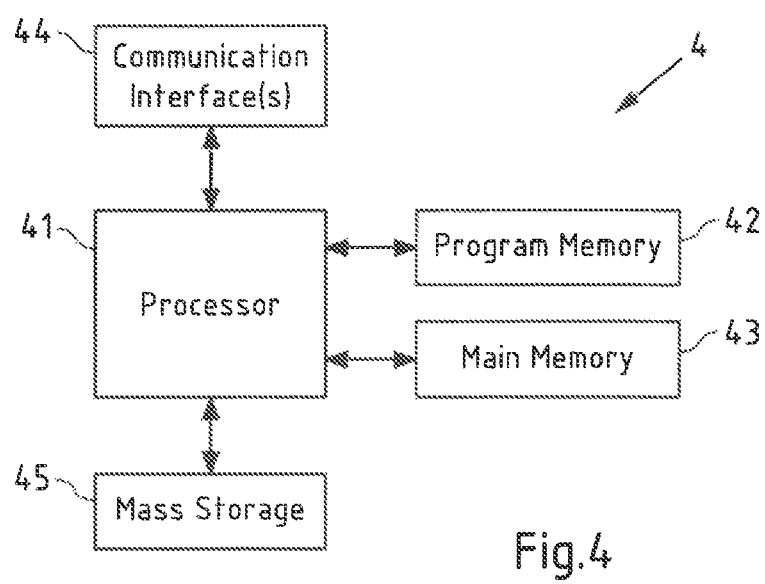
FIG. 4 is a block diagram of a server of FIG. 1 as an example of an apparatus according to the second aspect of the invention.

FIG. 4 is a block diagram of server 4 of FIG. 1 as an example of the at least one further apparatus according to the second aspect of the invention.

Server 4 comprises a processor 41. Processor 41 may represent a single processor or two or more processors, which are for instance at least partially coupled, for instance via a bus. Processor 41 may use program memory 42 and main memory 43 to execute a program code stored in program memory 42 (for instance program code causing server 4 to perform embodiments of the different methods, when executed on or by processor 41). Some or all of memories 42 and 43 may also be included into processor 41. One of or both of memories 42 and 43 may be fixedly connected to processor 41 or at least partially removable from processor 41. Program memory 42 may for instance be a non-volatile memory. It may for instance be a FLASH memory, any of a ROM, PROM, EPROM and EEPROM memory or a hard disc, to name but a few examples. Program memory 42 may also comprise an operating system for processor 41. Main memory 43 may for instance be a volatile memory. It may for instance be a RAM or DRAM memory, to give but a few non-limiting examples. It may for instance be used as a working memory for processor 41 when executing an operating system and/or programs.

Processor 41 further controls one or more communication interfaces 44 configured to receive and/or send information. For instance, server 4 may be configured to communicate with mobile device 3 of system 10 of FIG. 1 (corresponding to mobile device 3 of FIG. 2). Such a communication may for instance comprise receiving collected fingerprints, i.e. in particular access point identification information (e.g. ID6.1, ID6.2, ID6.3, ID6.4) and optionally signal quality information (e.g. corresponding RSSI values for radio signals received from each respective wireless access point), from mobile device 3. Also, server 4 may be able to send e.g. a determined radio map or a determined position estimate of a mobile device 3 to mobile device 3 for the purpose of positioning. The communication may for instance be based on a (e.g. partly) wireless connection. The communication interface 44 may thus comprise circuitry such as modulators, filters, mixers, switches and/or one or more antennas to allow transmission and/or reception of signals. In embodiments of the invention, communication interface 44 is inter alia configured to allow communication according to a 2G/3G/4G/5G cellular communication system and/or a non-cellular communication system, such as for instance a WLAN network and/or a Bluetooth network.

Processor 41 further interfaces with a mass storage 45, which may be part of the server 4 or remote from server 4, and which may for instance be used to store one or more databases. For instance, server 4 may store, in a database, collected fingerprints collected by mobile device 3. Further, server 4 may store in a database indoor map data and/or radio map data corresponding to one or more radiomaps e.g. including a radiomap representative of one or more floors of structure 2.

The components 42-45 of server 4 may for instance be connected with processor 41 by means of one or more serial and/or parallel busses.

The methods of the different aspects will now be described in more detail with respect to FIGS. 5 to 7.

Figure 5A:
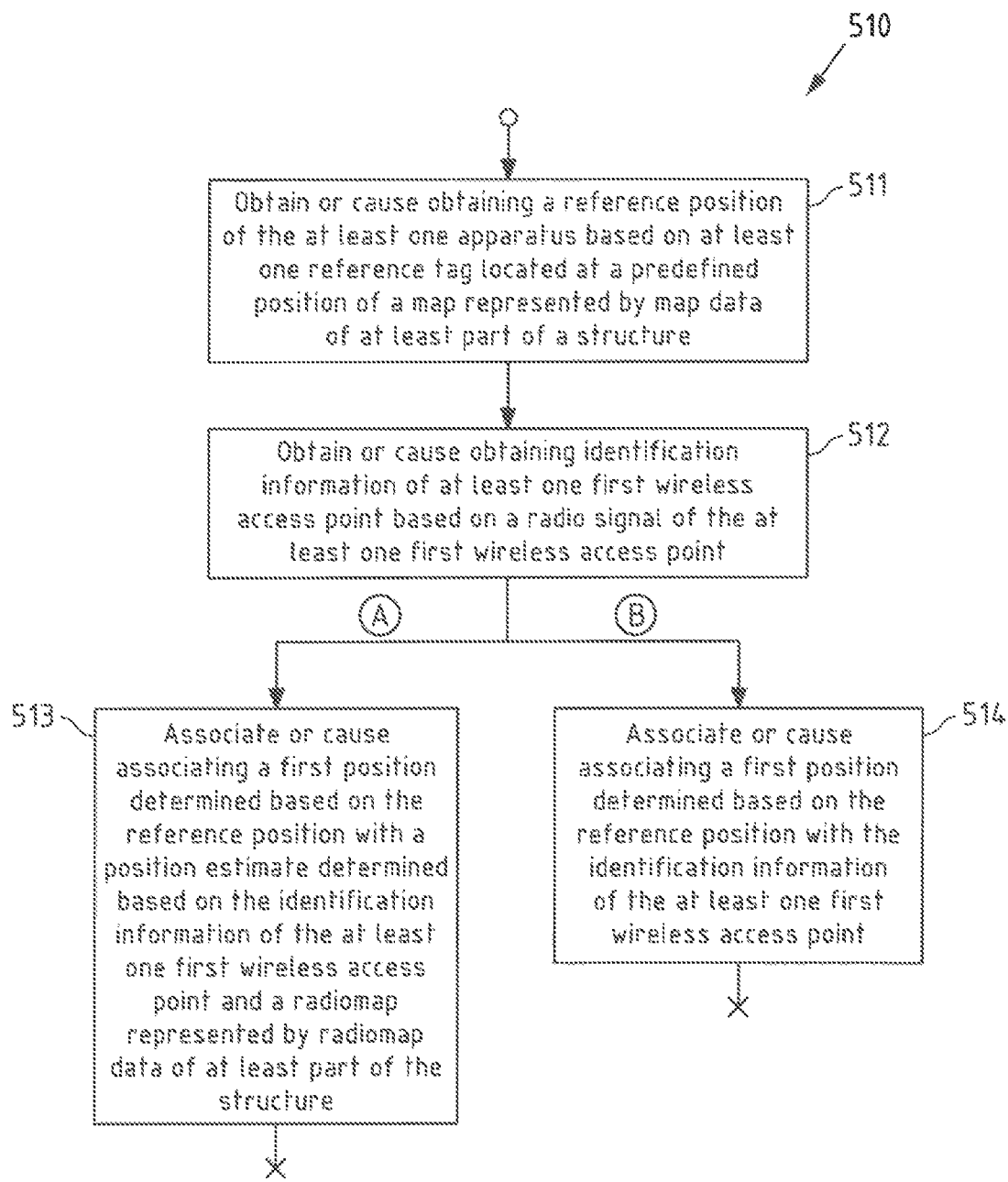
FIG. 5A is a flowchart illustrating an example of a method according to the first aspect of the invention.

FIG. 5A is a flowchart 510 illustrating an example of a method according to the first aspect of the invention. Without limiting the scope of the invention, it is assumed in the following that mobile device 3 (an example of the at least one apparatus according to the first aspect) as disclosed above with respect to system 10 of FIG. 1 performs the steps of flowchart 510. It is to be understood that any step of flowchart 510 may be performed by any one or more than one apparatus (e.g. one or more processors of mobile device 3).

In a step 511, mobile device 3 obtains (or processor 31 of mobile device 3 causes mobile device 3 to obtain) a reference position of the mobile device 3 (the at least one apparatus) based on at least one reference tag located at a predefined position of a map (e.g. the indoor map of structure 2) represented by map data of at least part of said structure 2. As discussed above, mobile device 3 may obtain a reference position for example by acquiring an image of QR Code 8 and by decoding position information has available by QR Code 8. In accordance with all aspects and all embodiments of the invention, the position of the reference tag (e.g. of QR Code 8) may be understood as corresponding to or as representing a reference position of mobile device 3 (of the at least one apparatus).

In a step 512, mobile device 3 obtains (or processor 31 courses mobile device 3 to obtain) identification information of at least one first wireless access point based on a radio signal of the at least one first wireless access point. For example, mobile device 3 may obtain for example identification information of wireless access points 6.1 and 6.2 based on radio signals received from wireless access points 6.1 and 6.2 at position I of path 20 illustrated in FIG. 1. Said wireless access points 6.1 and 6.2 may in such case to the at least one first wireless access point. With reference to FIG. 1, mobile device 3 may further obtain identification information of wireless access points 6.2, 6.3, 6.4 (at least one further wireless access point) based on respective radio signals when at position II of path 20. Said position II may in such case correspond to a further position of track 20. Similarly, mobile device 3 may obtain identification information of wireless access points 6.3 and 6.4 based on respective radio signals when at position III of path 20.

Referring back to FIG. 5A, following step 512, method 510 may proceed to step 513 (option A) and/or to step 514 (option B). In said step 513, mobile device 3 may associate (or processor 31 of mobile device 3 may cause mobile device 3 to associate) a first position determined based on the reference position with a position estimate determined based on the identification information of the at least one first wireless access point and a radiomap represented by radiomap data of at least part of structure 2. As disclosed above, mobile device 3 may obtain an estimate of its position either by relating the identification information to a radiomap stored at a mobile device 3 or from server 4 (server 4 relating identification information of the wireless access points received from mobile device 3 to a radiomap stored at server 4). Mobile device 3 may then associate the first position with the position estimate to align an indoor map of structure 2 with a radiomap of structure 2 as disclosed in detail above.

When proceeding to step 514, mobile device 3 may associate (or processor 31 of mobile device 3 may cause mobile device 3 to associate) the first position determined based on the reference position with the identification information of the at least one first wireless access point for example as part of a crowdsourcing process when generating a new or when supplementing an existing radiomap.

Figure 5B:
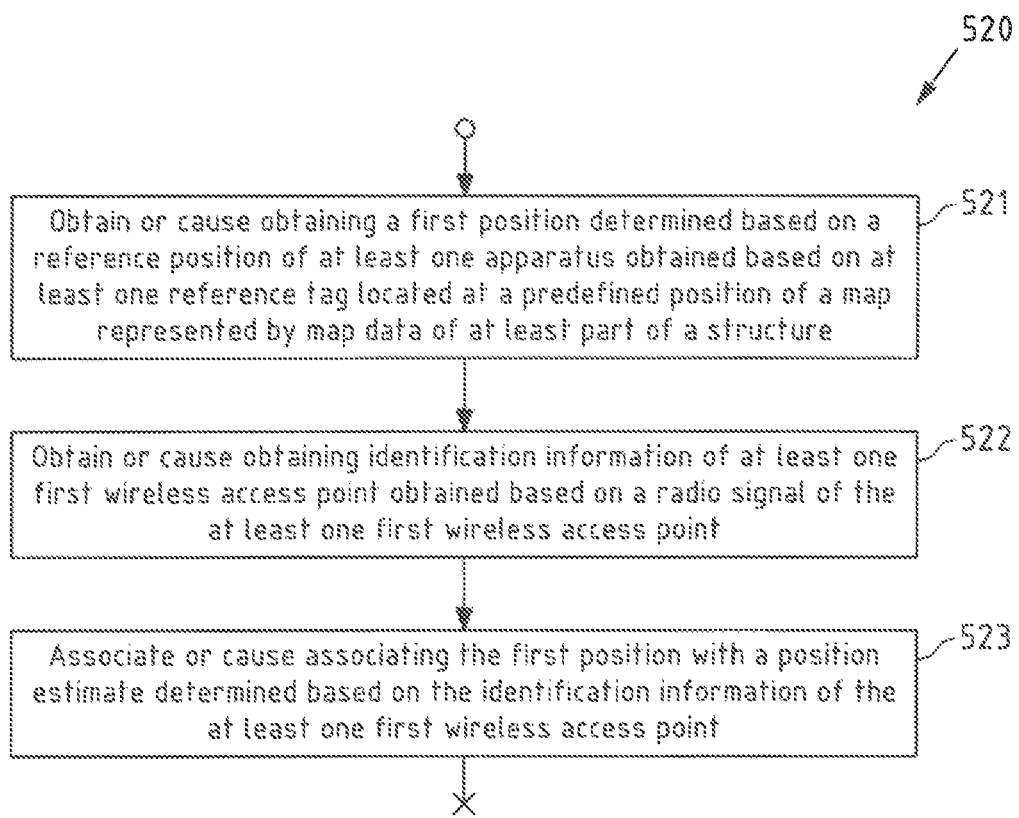
FIG. 5B is a flowchart illustrating an example of a method according to the second aspect of the invention.

FIG. 5B is a flowchart 520 illustrating an example of a method according to the second aspect of the invention. Without limiting the scope of the invention, it is assumed in the following that server 4 (an example of the at least one further apparatus according to the second aspect) as disclosed above with respect to system 10 of FIG. 1 performs the steps of flowchart 520. It is to be understood that any step of flowchart 520 may be performed by any one or more than one apparatus (e.g. one or more processors of server 4 and/or by one or more servers).

In step 521, server 4 may obtain (or processor 41 of server 4 may cause server 4 to obtain) a first position determined based on a reference position of at least one apparatus (for example of the mobile device 3) obtained based on at least one reference tag (for example the above discussed QR Code 8) located at a predefined position of a map represented by map data of at least part of a structure. In other words, mobile device 3 may obtain the first position as discussed above based on the reference tag (for example by acquiring an image of QR Code 8) and may communicate the first position to server 4 using the above disclosed network connection.

In step 522, server 4 may obtain (or processor 41 of server 4 may cause server 4 to obtain) identification information of at least one first wireless access point obtained based on a radio signal of the at least one first wireless access point. In other words, for example mobile device 3 may obtain the identification information of the at least one first wireless access point (for example of any one or more of wireless access points 6.1, 6.2, 6.3, 6.4 of FIG. 1) as disclosed above and may communicate said identification information to the at least one further apparatus (e.g. server 4) using the above discussed network connection.

In step 523, server 4 may associate (or processor 41 of server 4 may cause server 4 to associate) the first position with a position estimate determined based on the identification information of the at least one first wireless access point. Step 523 may performed by server 4 similar to step 513 discussed above in relation to FIG. 5A performed by mobile device 3. In other words, aligning of the indoor map with the radiomap can be performed either by mobile device 3 or by server 4.

Figure 6A:
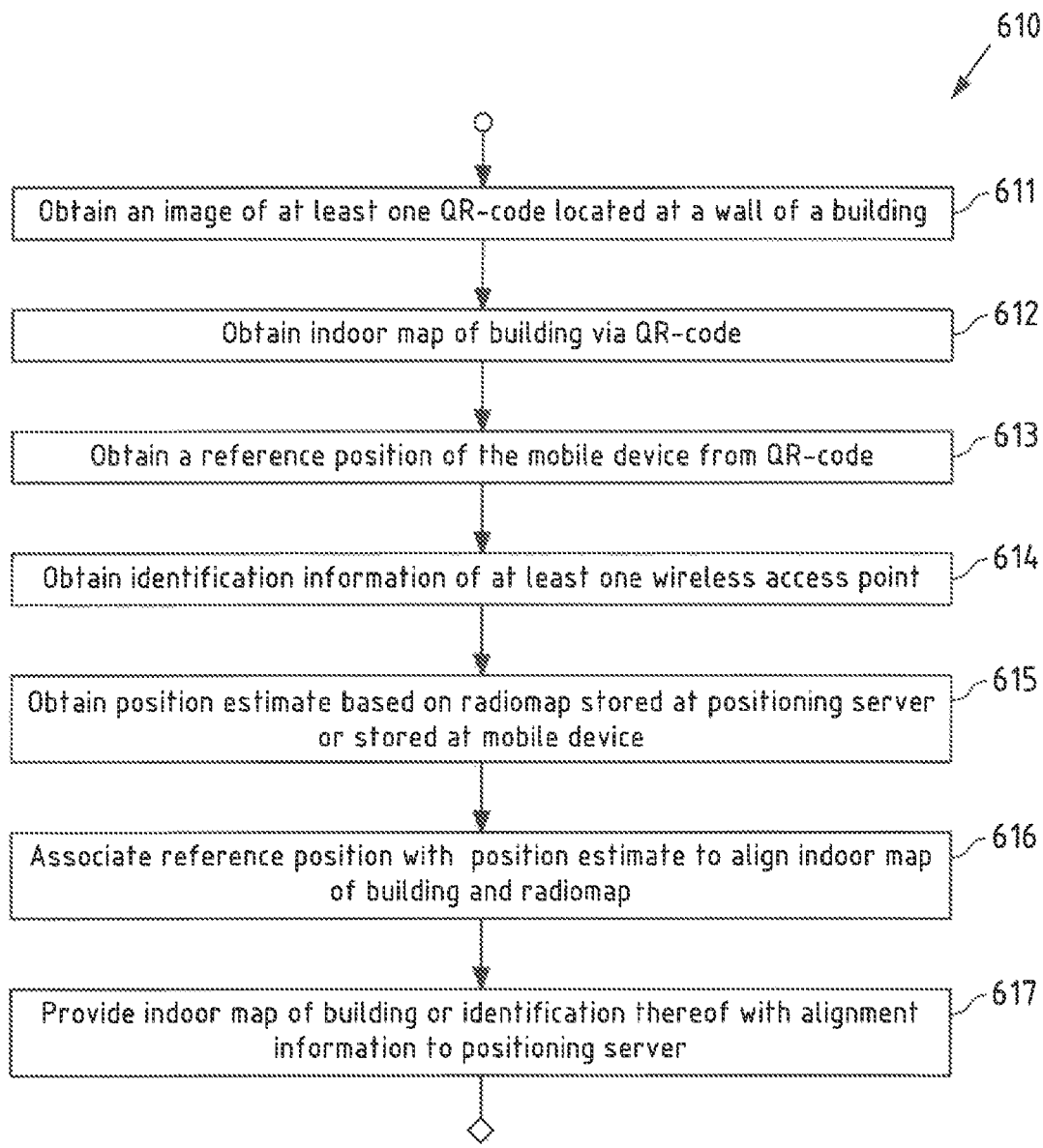
FIG. 6A is a flowchart illustrating an example of a method according to an embodiment of the invention.

FIG. 6A is a flowchart 610 illustrating an example of a method according to an embodiment of the invention. Without limiting the scope of the invention, it is assumed in the following that mobile device 3 (an example of the at least one apparatus according to the first aspect) as disclosed above with respect to system 10 of FIG. 1 performs the steps of flowchart 610. It is to be understood that any step of flowchart 610 may be performed by any one or more than one apparatus (e.g. one or more processors of mobile device 3).

A method as illustrated by a flowchart 610 may serve as an example embodiment of aligning an indoor map and a radiomap by mobile device 3.

In step 611, mobile device 3 obtains an image of at least one QR Code (e.g. QR Code 8 of FIG. 1) located at a wall of a building (an example of structure 2 of FIG. 1). Based on information held available by the QR Code 8, mobile device 3 obtains in step 612 an indoor map of said building, e.g. by downloading said indoor map using link information held available by the QR Code 8 or directly from the QR Code 8. In step 613, mobile device 3 obtains a reference position of mobile device 3 from the QR Code 8 as discussed in detail above. The reference position of the mobile device 3 may for example correspond to the position of the QR Code 8 obtained from information held available by the QR Code 8.

In step 614, mobile device 3 obtains identification information of at least one wireless access point as discussed above in detail for example with reference to FIG. 5A. Mobile device 3 then obtains in step 615 a position estimate, i.e. an estimate of its position, based on a radiomap stored at a positioning server (e.g. at server 4 of FIG. 1) or based on a radiomap stored at mobile device 3. In other words, mobile device 3 may either communicate the identification information to a server (for example to server 4 of FIG. 1) to be related to a radiomap stored at the server or may itself relate the identification information to a radiomap stored at mobile device 3 to obtain the position estimate.

At step 616, mobile device 3 may associate the reference position obtained based on the QR Code with the position estimate to align an indoor map for example stored at mobile device 3 (for example obtained based on the QR Code) with the radiomap based on which the position estimate has been obtained. In step 617, mobile device 3 provides the indoor map of the building (at least of part of the building, the building being an example of structure 2) in combination with alignment information (for example the above disclosed offset information) representative of an offset between the indoor map and the radiomap to the positioning server (e.g. server 4), for example to be used by further mobile devices. Instead of providing the indoor map, mobile device 3 may provide an indication (e.g. an identifier) of the indoor map, which may be already stored at the positioning server (e.g. server 4).

Figure 6B:
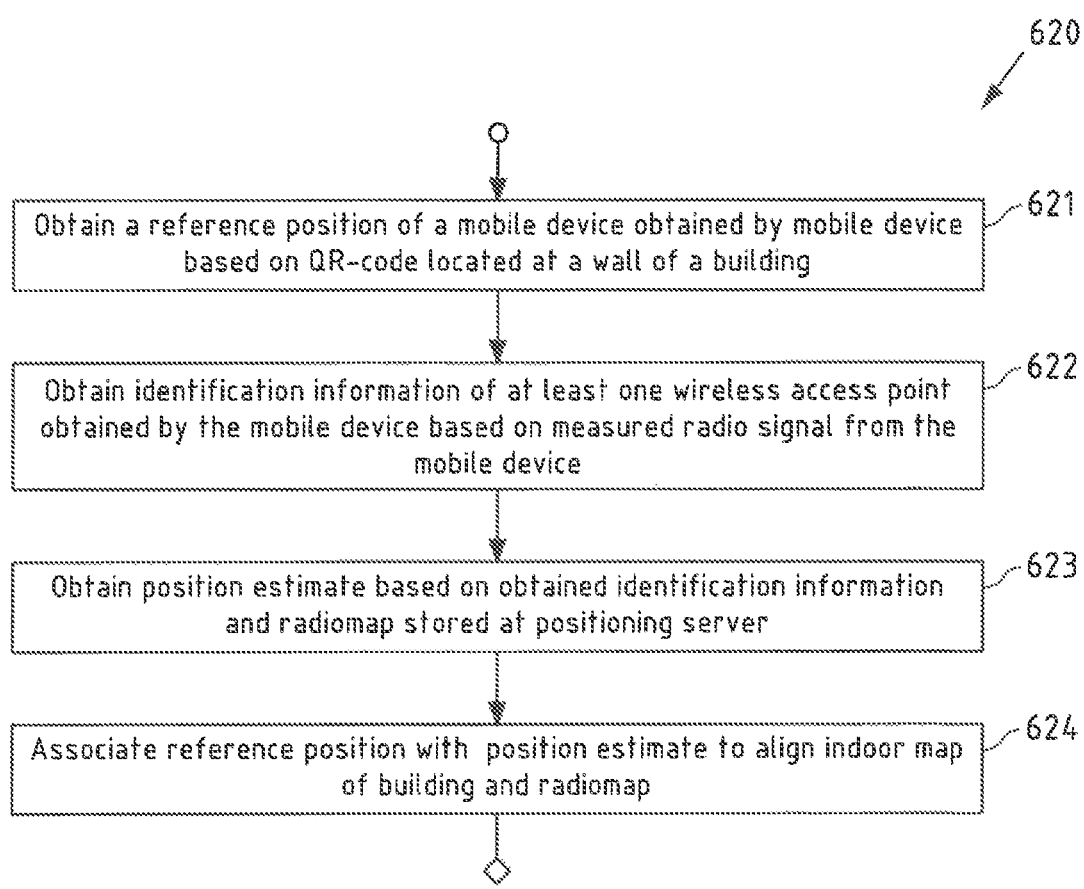
FIG. 6B is a flowchart illustrating an example of a method according to an embodiment of the invention.

As discussed above, an indoor map can be aligned with a radiomap either at mobile device 3 or at server 4. FIG. 6B is a flowchart 620 illustrating an example of a method according to an embodiment of the invention. Without limiting the scope of the invention, it is assumed in the following that server 4 (an example of the at least one further apparatus according to the second aspect) as disclosed above with respect to system 10 of FIG. 1 performs the steps of flowchart 620. It is to be understood that any step of flowchart 620 may be performed by any one or more than one apparatus (e.g. one or more processors of server 4, or by one or more servers).

A method as illustrated by a flowchart 620 may serve as an example embodiment of aligning an indoor map and a radiomap by server 4.

In step 621, server 4 may obtain (or processor 41 of server 4 may cause server 4 to obtain) a reference position (e.g. said first position determined based on the reference position of mobile device 3) obtained by mobile device 3 based the above discussed QR Code 8 located at a wall of a building.

In step 622, server 4 may obtain (or processor 41 of server 4 may cause server 4 to obtain) identification information of at least one first wireless access point obtained (by the mobile device 3) based on a radio signal of the at least one first wireless access point. As disclosed above, for example mobile device 3 may obtain the identification information of the at least one first wireless access point (for example of any one or more of wireless access points 6.1, 6.2, 6.3, 6.4 of FIG. 1) and may communicate said identification information to the at least one server 4 using the above discussed network connection.

In step 623, server 4 may obtain a position estimate of mobile device 3 based on the obtained identification information and based on a radiomap stored at server 4. In step 624, server 4 may associate (or processor 41 of server 4 may cause server 4 to associate) the reference position with the position estimate to align the indoor map with the radiomap.

Figure 7:
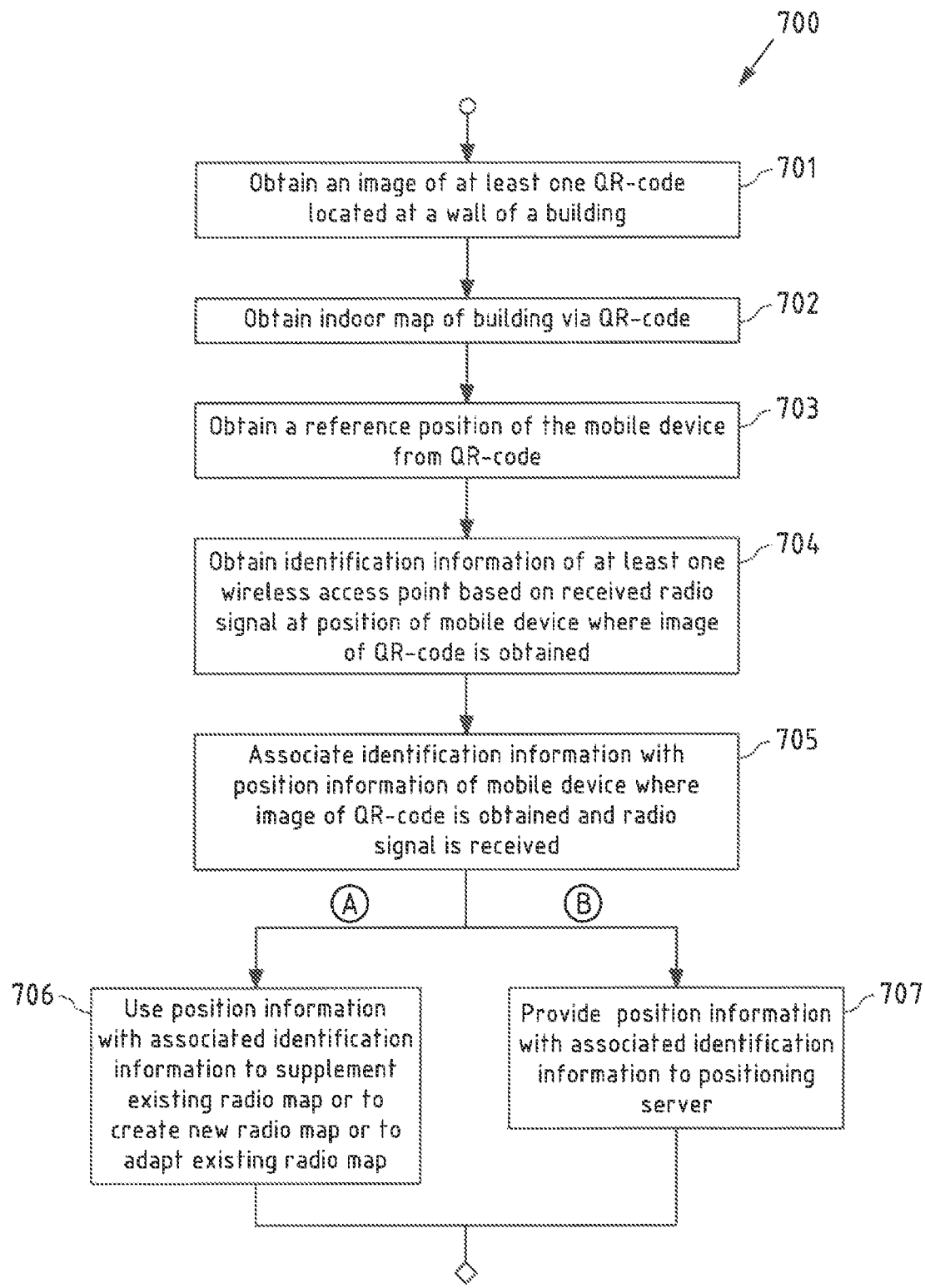
FIG. 7 is a flowchart illustrating an example of a method according to an embodiment of the invention.

FIG. 7 is a flowchart 700 illustrating an example of a method according to an embodiment of the invention. Without limiting the scope of the invention, it is assumed in the following that mobile device 3 (an example of the at least one apparatus according to the first aspect) as disclosed above with respect to system 10 of FIG. 1 performs the steps of flowchart 700. It is to be understood that any step of flowchart 700 may be performed by any one or more than one apparatus (e.g. one or more processors of mobile device 3).

A method as illustrated by a flowchart 700 may serve as an example embodiment of creating a new radiomap or supplementing an existing radiomap by mobile device 3.

In step 701, mobile device 3 obtains an image of at least one QR Code 8 (an example of a reference tag) located at a wall of a building (an example of a predefined position). In step 702, mobile device 3 obtains an indoor map of the building using information held available by the QR Code 8 e.g. using a download link held available by the QR Code or directly from the QR Code 8.

In step 703, mobile device 3 obtains a reference position of the mobile device 3 from QR Code 8 as discussed above. In step 704, mobile device 3 obtains identification information of at least one wireless access point based on received one or more radio signals at the position of mobile device 3 where the image of the QR Code 8 is obtained. In other words, mobile device 3 obtains for example IDs of wireless access points corresponding to radio signals that are receivable at the position where mobile device 3 obtains the image of the QR Code 8 (an example of the reference position of the mobile device 3). In step 705, mobile device 3 associates the identification information obtained at the reference position with position information of the mobile device 3 where the image of the QR Code 8 is obtained and where the corresponding one or more radio signals are received. In other words, mobile device 3 associates the IDs of wireless access points corresponding to radio signals receivable at the reference position with the reference position.

In step 706 (option A), mobile device 3 may use the position information of the reference position with the associated identification information to supplement an existing radiomap (as additional information) or to create a new radiomap (for example as a first fingerprint of a radiomap generated while moving along the path 20 of FIG. 1). Mobile device 3 may use this position information with the associated identification information to adapt (e.g. correct) an existing radiomap for example by replacing an existing fingerprint by a new fingerprint including the information obtained at the reference position. Alternatively or in addition, in step 707 (option B), mobile device 3 may provide the position information of the reference position with the associated identification information to a positioning server (e.g. server 4) to be used for supplementing an existing radiomap at the positioning server, or to create a new radiomap at the positioning server or to adapt (e.g. correct) an existing radiomap stored at the positioning server.

Figure 8:
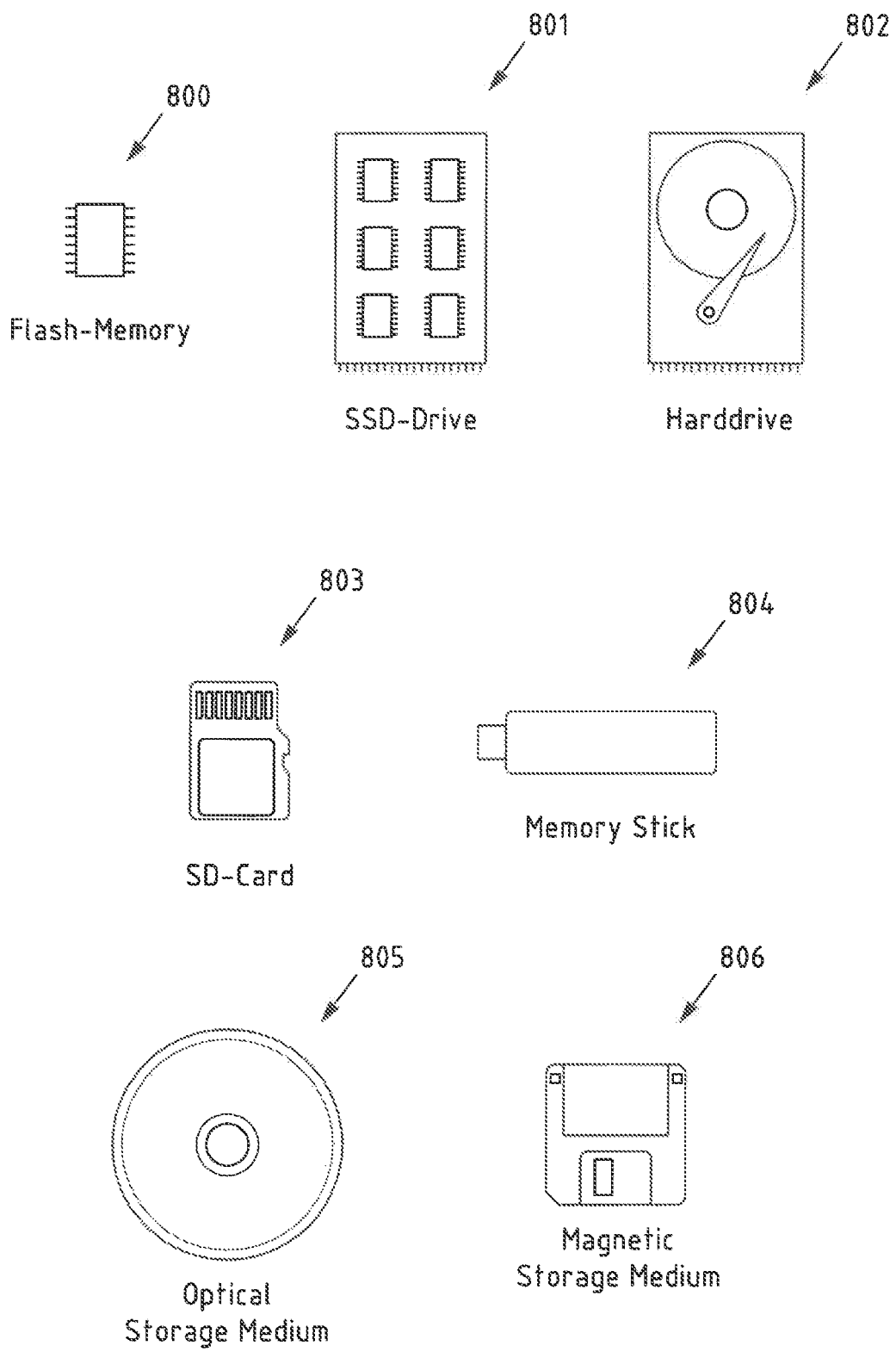
FIG. 8 is a schematic illustration of examples of tangible storage media according to the invention.

FIG. 8 is a schematic illustration of examples of tangible and non-transitory computer-readable storage media according to the present invention that may for instance be used to implement memory 32 of FIG. 3 or memory 42 of FIG. 4. To this end, FIG. 8 displays a flash memory 800, which may for instance be soldered or bonded to a printed circuit board, a solid-state drive 801 comprising a plurality of memory chips (e.g. Flash memory chips), a magnetic hard drive 802, a Secure Digital (SD) card 803, a Universal Serial Bus (USB) memory stick 804, an optical storage medium 805 (such as for instance a CD-ROM or DVD) and a magnetic storage medium 806.

The following example embodiments of the invention are also disclosed:

Embodiment 1

A method performed by at least one apparatus, the method comprising:

obtaining or causing obtaining a reference position of the at least one apparatus based on at least one reference tag located at a predefined position of a map (e.g. an indoor map) represented by map data of at least part of (e.g. a floor or part of a floor) a structure (e.g. a building);

obtaining or causing obtaining identification information (e.g. an ID) of at least one first wireless access point based on a radio signal of the at least one first wireless access point;

associating or causing associating a first position determined based on the reference position with at least one of:

a position estimate determined based on the identification information of the at least one first wireless access point and a radiomap represented by radiomap data of at least part of a structure;

the identification information of the at least one first wireless access point.

Embodiment 2

The method according to embodiment 1, wherein the at least one apparatus is a mobile device, in particular an Internet-of-Things (IoT) device, a smart home device, a smartphone, a tablet computer, a notebook computer, a smart watch, and a smart band.

Embodiment 3

The method according to any of embodiments 1 or 2, wherein obtaining or causing obtaining the reference position of the at least one apparatus comprises:
- setting or causing setting the reference position equal to a position of the at least one reference tag or to a position shifted from a position of the at least one reference tag by a predefined value.

Embodiment 4

The method according to any of the preceding embodiments, wherein obtaining or causing obtaining identification information of at least one first wireless access point further comprises:
- obtaining or causing obtaining radio quality information (in particular a Received Signal Strength Indication, RSSI) of the radio signal of the at least one first wireless access point.

Embodiment 5

The method according to any of the preceding embodiments, wherein associating or causing associating the first position with the position estimate comprises:
- replacing or causing replacing at least horizontal position data comprised by the radiomap data corresponding to the position estimate with horizontal position data corresponding to the first position.

Embodiment 6

The method according to any of the preceding embodiments, wherein associating or causing associating the first position with the position estimate comprises:
- determining or causing determining offset information representing at least a horizontal distance between the first position and the position estimate;
- the method further comprising at least one of:
- adapting or causing adapting at least part of horizontal position data comprised by the map data based on the offset information to generate adapted map data;
- adapting or causing adapting at least part of horizontal position data comprised by the radiomap data based on the offset information to generate adapted radiomap data.

Embodiment 7

The method according to embodiment 6, further comprising at least one of:
- providing or causing providing the offset information to at least one further apparatus via a network connection;
- providing or causing providing the offset information and the map data of at least part of the structure to at least one further apparatus via a network connection;
- providing or causing providing the adapted map data to at least one further apparatus via a network connection;
- providing or causing providing the adapted radiomap data to at least one further apparatus via a network connection.

Embodiment 8

The method according to any of the preceding embodiments, wherein associating or causing associating the first position with the position estimate comprises:
- associating or causing associating a subset (in particular a layer) of the radiomap data corresponding to an absolute altitude or to an absolute altitude range with a subset (map data of floor) of the map data representative of one of at least two floors of the structure based on the first position.

Embodiment 9

The method according to any of the preceding embodiments, wherein associating or causing associating the first position with the identification information of the at least one first wireless access point comprises at least one of:
- storing or causing storing the first position in association with the identification information of the at least one first wireless access point as at least part of radiomap data;
- providing or causing providing the first position in association with the identification information of the at least one first wireless access point to at least one further apparatus in particular to be stored as at least part of radiomap data.

Embodiment 10

The method according to any of the preceding embodiments, further comprising:
- obtaining or causing obtaining identification information of at least one further wireless access point based on a respective radio signal of the at least one further wireless access point received at at least one corresponding further position of a track including the first position while moving along said track;
- wherein associating or causing associating the first position with the identification information of the at least one first wireless access point further comprises:
- associating or causing associating the at least one further position with the identification information of the at least one further wireless access point.

Embodiment 11

The method according to embodiment 10, further comprising:
- storing or causing storing the first position in association with the identification information of the at least one first wireless access point and the at least one further position in association with the identification information of the at least one further wireless access point as at least part of radiomap data;
- providing or causing providing the first position in association with the identification information of the at least one first wireless access point and the at least one further position in association with the identification information of the at least one further wireless access point to at least one further apparatus.

Embodiment 12

The method according to any of embodiments 10 or 11, further comprising:
- deriving or causing deriving relative altitude information (in particular one or more floor indices) representative of a floor of the structure from the reference position;
- assigning or causing assigning the relative altitude information to the at least one further position of the track.

Embodiment 13

The method according to embodiment 12, further comprising at least one of:
  storing or causing storing the first position and the at least one further position in association with the relative altitude information, in particular as at least part of said radiomap data;
  providing or causing providing the first position and the at least one further position in association with the relative altitude information to at least one further apparatus.

Embodiment 14

The method according to any of the preceding embodiments, wherein obtaining or causing obtaining a reference position of the at least one apparatus based on at least one reference tag comprises:
  deriving the reference position from reference position information held available by the at least one reference tag;
  wherein the reference position information comprises at least one or more of:
    information representative of a floor index of a floor of the structure on which the at least one reference tag is located;
    information representative of an absolute altitude of a position of the at least one reference tag;
    information representative of a position of the at least one reference tag in relation to a floor of the structure on which the at least one reference tag is located; and
    information representative of longitude and latitude of a position of the at least one reference tag.

Embodiment 15

The method according to any of the preceding embodiments, further comprising:
  obtaining the map data of the at least part of the structure from the reference tag or based on information held available by the reference tag.

Embodiment 16

The method according to any of the preceding embodiments, wherein the at least one reference tag corresponds to or comprises at least one or more of:
  a machine readable optical label;
  a Near-Field Communication, NFC, tag;
  a Radio-Frequency Identification, RFID, tag.

Embodiment 17

The method according to any of the preceding embodiments, wherein the wireless access point corresponds to or comprises at least one of:
  a Wireless Local Area Network, WLAN, access point;
  a Bluetooth access point; or
  an access point of a cellular communications network.

Embodiment 18

A method performed by at least one further apparatus, the method comprising:
  obtaining or causing obtaining a first position determined (in particular at a mobile device, in particular at the at least one apparatus) based on a reference position of at least one apparatus (in particular the mobile device) obtained (in particular at the mobile device, in particular at the at least one apparatus) based on at least one reference tag located at a predefined position of a map represented by map data of at least part of a structure (in particular a building);
  obtaining or causing obtaining (in particular from the mobile device, in particular from the at least one apparatus) identification information of at least one first wireless access point obtained (in particular by the mobile device, in particular by the at least one apparatus) based on a radio signal of the at least one first wireless access point;
  associating or causing associating the first position with a position estimate determined (in particular at the mobile device or at the at least one further apparatus) based on the identification information of the at least one first wireless access point and a radiomap (in particular stored at the mobile device and/or at the at least one further apparatus) represented by radiomap data of at least part of a structure.

Embodiment 19

The method according to embodiment 18, wherein the at least one further apparatus is at least one server.

Embodiment 20

The method according to any of the embodiments 18 or 19, wherein associating or causing associating the first position with the position estimate comprises:
  replacing or causing replacing at least horizontal position data comprised by the radiomap data corresponding to the position estimate with horizontal position data corresponding to the first position.

Embodiment 21

The method according to any of the preceding embodiments 18 to 20, wherein associating or causing associating the first position with the position estimate comprises:
  determining or causing determining offset information representing at least a horizontal distance between the first position and the position estimate;
  the method further comprising at least one of:
  adapting or causing adapting at least part of horizontal position data comprised by the map data based on the offset information to generate adapted map data;
  adapting or causing adapting at least part of horizontal position data comprised by the radiomap data based on the offset information to generate adapted radiomap data.

Embodiment 22

The method according to any of the preceding embodiments 18 to 21, wherein associating or causing associating the first position with the position estimate comprises:
  associating or causing associating a subset (in particular a layer) of the radiomap data corresponding to an absolute altitude or to an absolute altitude range with a subset (map data of floor) of the map data representative of one of at least two floors of the structure based on the first position.

Embodiment 23

The method according to any of embodiments 18 to 22, further comprising:
  deriving or causing deriving relative altitude information (in particular one or more floor indices) representative of a floor of the structure from the reference position;
  assigning or causing assigning the relative altitude information to the at least one further position of the track.

Embodiment 24

The method according to embodiment 23, further comprising:
  storing or causing storing the first position and the at least one further position in association with the relative altitude information, in particular as at least part of said radiomap data.

Embodiment 25

The method according to any of the preceding embodiments 18 to 24, wherein the at least one reference tag corresponds to or comprises at least one or more of:
  a machine readable optical label;
  a Near-Field Communication, NFC, tag;
  a Radio-Frequency Identification, RFID, tag.

Embodiment 26

The method according to any of the preceding embodiments 18 to 25, wherein the wireless access point corresponds to or comprises at least one of:
  a Wireless Local Area Network, WLAN, access point;
  a Bluetooth access point; or
  an access point of a cellular communications network.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (1) to a combination of processor(s) or (2) to sections of processor(s)/software (including digital signal processor(s)), software, and memory(ies) that work together to cause an apparatus, such as a mobile device, to perform various functions) and (c) to circuits, such as a microprocessor(s) or a section of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (1) A, or (2) B, or (3) C, or (4) A and B, or (5) A and C, or (6) B and C, or (7) A and B and C.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

That which is claimed is:

1. A method performed by at least one apparatus, the method comprising:
  obtaining or causing obtaining a reference position of the at least one apparatus based on at least one reference tag located at a predefined position of a map represented by map data of at least part of a structure;
  obtaining or causing obtaining identification information of at least one first wireless access point based on a radio signal of the at least one first wireless access point;
  associating or causing associating a first position determined based on the reference position with a position estimate determined based on the identification information of the at least one first wireless access point and a radiomap represented by radiomap data of at least part of a structure, wherein associating or causing associating of the first position with the position estimate comprises:
    associating or causing associating a subset of the radiomap data corresponding to an absolute altitude or to an absolute altitude range with a subset of the map data representative of one of at least two floors of the structure based on the first position, and
    determining or causing determining offset information representing at least a horizontal distance between the first position and the position estimate; and
  adapting or causing adapting at least part of horizontal position data comprised by the map data based on the offset information to generate adapted map data; or
  adapting or causing adapting at least part of horizontal position data comprised by the radiomap data based on the offset information to generate adapted radiomap data.

2. The method according to claim 1, wherein associating or causing associating the first position with the position estimate comprises:
    updating or causing updating of radiomap data of the radio map corresponding to the position estimate based at least in part on horizontal position data corresponding to the first position.

3. The method according to claim 1, further comprising at least one of:
    providing or causing providing the offset information to at least one further apparatus via a network connection;
    providing or causing providing the offset information and the map data of at least part of the structure to at least one further apparatus via a network connection;
    providing or causing providing the adapted map data to at least one further apparatus via a network connection; or
    providing or causing providing the adapted radiomap data to at least one further apparatus via a network connection.

4. The method according to claim 1, further comprising associating or causing associating a first position determined based on the reference position with the identification information of the at least one first wireless access point.

5. The method according to claim 4, wherein associating or causing associating the first position with the identification information of the at least one first wireless access point comprises at least one of:
    storing or causing storing the first position in association with the identification information of the at least one first wireless access point as at least part of radiomap data; or
    providing or causing providing the first position in association with the identification information of the at least one first wireless access point to at least one further apparatus.

6. The method according to claim 1, further comprising:
    obtaining or causing obtaining identification information of at least one further wireless access point based on a respective radio signal of the at least one further wireless access point received at least one corresponding further position of a track including the first position while moving along said track;
    wherein associating or causing associating the first position with the identification information of the at least one first wireless access point further comprises:
    associating or causing associating the at least one further position with the identification information of the at least one further wireless access point.

7. The method according to claim 6, further comprising:
    storing or causing storing the first position in association with the identification information of the at least one first wireless access point and the at least one further position in association with the identification information of the at least one further wireless access point as at least part of radiomap data; and
    providing or causing providing the first position in association with the identification information of the at least one first wireless access point and the at least one further position in association with the identification information of the at least one further wireless access point to at least one further apparatus.

8. The method according to claim 6, further comprising:
    deriving or causing deriving relative altitude information representative of a floor of the structure from the reference position; and
    assigning or causing assigning the relative altitude information to the at least one further position of the track.

9. The method according to claim 8, further comprising at least one of:
    storing or causing storing the first position and the at least one further position in association with the relative altitude information as at least part of said radiomap data; or
    providing or causing providing the first position and the at least one further position in association with the relative altitude information to at least one further apparatus.

10. The method according to claim 1, wherein obtaining or causing obtaining a reference position of the at least one apparatus based on at least one reference tag comprises:
    deriving the reference position from reference position information held available by the at least one reference tag;
    wherein the reference position information comprises at least one or more of:
    information representative of a floor index of a floor of the structure on which the at least one reference tag is located;
    information representative of an absolute altitude of a position of the at least one reference tag;
    information representative of a position of the at least one reference tag in relation to a floor of the structure on which the at least one reference tag is located; and
    information representative of longitude and latitude of a position of the at least one reference tag.

11. An apparatus comprising at least one processor and at least one memory that contains program code, wherein the memory and the program code are configured to use the at least one processor to cause the apparatus to:
    obtain or cause obtaining a reference position of the at least one apparatus based on at least one reference tag located at a predefined position of a map represented by map data of at least part of a structure;
    obtain or cause obtaining identification information of at least one first wireless access point based on a radio signal of the at least one first wireless access point;
    obtain or cause obtaining identification information of at least one further wireless access point based on a respective radio signal of the at least one further wireless access point received at at least one corresponding further position of a track including the first position while moving along said track;
    associate or cause associating a first position determined based on the reference position with a position estimate determined based on the identification information of the at least one first wireless access point and a radiomap represented by radiomap data of at least part of a structure, wherein associating or causing associating of the first position with the position estimate comprises associating or causing associating a subset of the radiomap data corresponding to an absolute altitude or to an absolute altitude range with a subset of the map data representative of one of at least two floors of the structure based on the first position;
    associate or cause associating the first position with the identification information of the at least one first wireless access point by associating or causing associating the at least one further position with the identification information of the at least one further wireless access point;
    store or cause storing the first position in association with the identification information of the at least one first wireless access point and the at least one further position in association with the identification information of the at least one further wireless access point as at least part of radiomap data; and provide or cause providing the first position in association with the identification information of the at least one first wireless access point and the at least one further position in association with the identification information of the at least one further wireless access point to at least one further apparatus.

12. The apparatus according to claim 11, wherein the memory and the program code are configured to use the at least one processor to cause the apparatus to associate or cause associating the first position with the position estimate by:
   updating or causing updating of radiomap data of the radio map corresponding to the position estimate based at least in part on horizontal position data corresponding to the first position.

13. The apparatus according to claim 11, wherein the memory and the program code are configured to use the at least one processor to cause the apparatus to associate or cause associating the first position with the position estimate by:
   determining or causing determining offset information representing at least a horizontal distance between the first position and the position estimate; and
   wherein the memory and the program code are further configured to use the at least one processor to cause the apparatus to at least one of:
   adapt or cause adapting at least part of horizontal position data comprised by the map data based on the offset information to generate adapted map data; or
   adapt or cause adapting at least part of horizontal position data comprised by the radiomap data based on the offset information to generate adapted radiomap data.

14. The apparatus according to claim 11, wherein the memory and the program code are configured to use the at least one processor to cause the apparatus to associate or cause associating a first position determined based on the reference position with the identification information of the at least one first wireless access point.

15. An apparatus comprising at least one processor and at least one memory that contains program code, wherein the memory and the program code are configured to use the at least one processor to cause the apparatus to:
   obtain or cause obtaining a reference position of the at least one apparatus based on at least one reference tag located at a predefined position of a map represented by map data of at least part of a structure;
   obtain or cause obtaining identification information of at least one first wireless access point based on a radio signal of the at least one first wireless access point;
   obtain or cause obtaining identification information of at least one further wireless access point based on a respective radio signal of the at least one further wireless access point received at at least one corresponding further position of a track including the first position while moving along said track;
   associate or cause associating a first position determined based on the reference position with a position estimate determined based on the identification information of the at least one first wireless access point and a radiomap represented by radiomap data of at least part of a structure, wherein associating or causing associating of the first position with the position estimate comprises associating or causing associating a subset of the radiomap data corresponding to an absolute altitude or to an absolute altitude range with a subset of the map data representative of one of at least two floors of the structure based on the first position;
   associate or cause associating the first position with the identification information of the at least one first wireless access point by associating or causing associating the at least one further position with the identification information of the at least one further wireless access point;
   derive or cause deriving relative altitude information representative of a floor of the structure from the reference position; and
   assign or cause assigning the relative altitude information to the at least one further position of the track.

16. The apparatus according to claim 15, wherein the memory and the program code are further configured to use the at least one processor to cause the apparatus to at least one of:
   store or cause storing the first position and the at least one further position in association with the relative altitude information as at least part of said radiomap data; or
   provide or cause providing the first position and the at least one further position in association with the relative altitude information to at least one further apparatus.

* * * * *

UNITED STATES PATENT AND TRADEMARK OFFICE
CERTIFICATE OF CORRECTION

| | |
|---|---|
| PATENT NO. | : 11,506,744 B2 |
| APPLICATION NO. | : 16/943341 |
| DATED | : November 22, 2022 |
| INVENTOR(S) | : Tatiana Vyunova et al. |

It is certified that error appears in the above-identified patent and that said Letters Patent is hereby corrected as shown below:

In the Claims

In Column 33, Line 5, Claim 2, delete "radio map" and insert -- radiomap --, therefor.

In Column 35, Line 15, Claim 12, delete "radio map" and insert -- radiomap --, therefor.

Signed and Sealed this
Tenth Day of October, 2023

Katherine Kelly Vidal
*Director of the United States Patent and Trademark Office*